US009497338B2

(12) United States Patent
Lee et al.

(10) Patent No.: US 9,497,338 B2
(45) Date of Patent: Nov. 15, 2016

(54) IMAGE FORMING APPARATUS SUPPORTING NEAR FIELD COMMUNICATION (NFC) FUNCTION AND METHOD OF SETTING AN IMAGE JOB USING NFC DEVICE

(71) Applicant: Samsung Electronics Co., Ltd, Suwon-si, Gyeonggi-do (KR)

(72) Inventors: Kwangwoo Lee, Daejeon (KR); Dae-hyun Kim, Yongin-si (KR); Jin-hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/048,084

(22) Filed: Oct. 8, 2013

(65) Prior Publication Data
US 2014/0185088 A1 Jul. 3, 2014

(30) Foreign Application Priority Data

Jan. 3, 2013 (KR) ........................ 10-2013-0000634

(51) Int. Cl.
*H04N 1/00* (2006.01)
*H04W 4/00* (2009.01)
*H04N 1/32* (2006.01)
*H04W 88/06* (2009.01)

(52) U.S. Cl.
CPC ...... *H04N 1/00342* (2013.01); *H04N 1/00307* (2013.01); *H04N 1/00411* (2013.01); *H04N 1/00474* (2013.01); *H04N 1/00482* (2013.01); *H04N 1/00962* (2013.01); *H04N 1/32106* (2013.01); *H04W 4/008* (2013.01); *H04M 2250/04* (2013.01); *H04N 1/00225* (2013.01); *H04N 2201/001* (2013.01); *H04N 2201/006* (2013.01); *H04N 2201/0094* (2013.01); *H04N 2201/3212* (2013.01); *H04N 2201/3278* (2013.01); *H04W 88/06* (2013.01)

(58) Field of Classification Search
None
See application file for complete search history.

(56) References Cited

U.S. PATENT DOCUMENTS

| 8,171,137 | B1 | 5/2012 | Parks et al. |
| 8,189,225 | B1 | 5/2012 | Lo et al. |
| 8,749,823 | B2 | 6/2014 | Kato |
| 2007/0043594 | A1 | 2/2007 | Lavergne |
| 2008/0109309 | A1 | 5/2008 | Landau et al. |
| 2008/0152376 | A1* | 6/2008 | Ananthesh ............ 399/81 |
| 2008/0222711 | A1 | 9/2008 | Michaelis |
| 2009/0052348 | A1 | 2/2009 | Kato et al. |
| 2009/0271263 | A1 | 10/2009 | Regmi et al. |

(Continued)

FOREIGN PATENT DOCUMENTS

| CN | 102356627 A | 2/2012 |
| EP | 2 364 009 A2 | 9/2011 |

*Primary Examiner* — Benny Q Tieu
*Assistant Examiner* — Haris Sabah
(74) *Attorney, Agent, or Firm* — Jefferson IP Law, LLP

(57) ABSTRACT

An image forming apparatus supporting a near field communication (NFC) function and a method of performing setting an image job by using an NFC device. The method includes tagging an NFC device to receive setting information stored in the NFC device and performing an image job based on the received setting information.

22 Claims, 20 Drawing Sheets

(56) References Cited

U.S. PATENT DOCUMENTS

| | | |
|---|---|---|
| 2009/0287928 A1 | 11/2009 | Braun |
| 2010/0058359 A1 | 3/2010 | Ferlitsch |
| 2010/0067063 A1* | 3/2010 | Jang ............................. 358/402 |
| 2010/0198675 A1 | 8/2010 | Mockli |
| 2010/0214604 A1 | 8/2010 | Hosono et al. |
| 2010/0228883 A1* | 9/2010 | Takagi ............................. 710/4 |
| 2010/0321718 A1* | 12/2010 | Mihira ........................ 358/1.14 |
| 2011/0116125 A1 | 5/2011 | Park |
| 2011/0194138 A1 | 8/2011 | Seo et al. |
| 2011/0215921 A1 | 9/2011 | Ben Ayed et al. |
| 2011/0273738 A1* | 11/2011 | Tanaka et al. ............... 358/1.14 |
| 2011/0292445 A1 | 12/2011 | Kato |
| 2012/0041823 A1 | 2/2012 | Khan |
| 2012/0089520 A1 | 4/2012 | Mardikar |
| 2012/0206388 A1 | 8/2012 | Tsuboi et al. |
| 2012/0209686 A1 | 8/2012 | Horowitz et al. |
| 2013/0070297 A1* | 3/2013 | Kato ........................... 358/1.15 |
| 2013/0182277 A1* | 7/2013 | Iguchi ......................... 358/1.14 |
| 2013/0250324 A1* | 9/2013 | Tse .............................. 358/1.13 |

\* cited by examiner

\<NFC enabled phone\>

\<NFC enabled phone\>

NFC tag

| Item | Value |
|---|---|
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

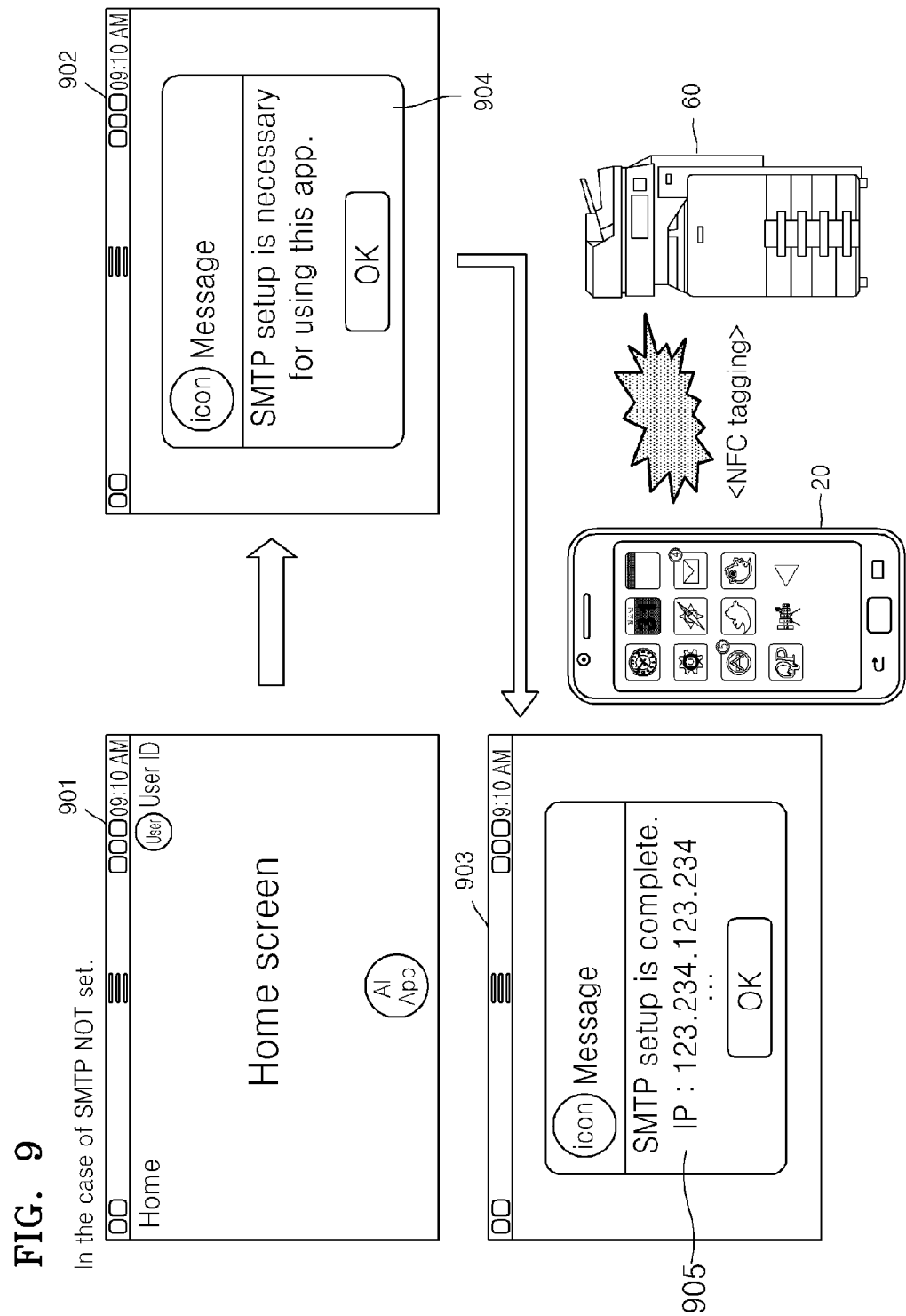

IMAGE FORMING APPARATUS SUPPORTING NEAR FIELD COMMUNICATION (NFC) FUNCTION AND METHOD OF SETTING AN IMAGE JOB USING NFC DEVICE

CROSS-REFERENCE TO RELATED APPLICATIONS

This application claims priority under 35 U.S.C. §119 from Korean Patent Application No. 10-2013-0000634, filed on Jan. 3, 2013, in the Korean Intellectual Property Office, the disclosure of which is incorporated herein in its entirety by reference.

BACKGROUND OF THE INVENTION

1. Field of the Invention

The present general inventive concept relates to an image forming apparatus supporting a near field communication (NFC) function and a method of performing setting of an image job by using an NFC device.

2. Description of the Related Art

Near field communication (NFC) is a contactless short-range wireless communication standard between electronic devices within a short distance of 10 cm with low power consumption by using a frequency of 13.56 MHz, and was developed by the joint work of NXP Semiconductors of Netherlands and Sony of Japan in 2002. A data transfer rate of NFC is 424 Kbps, and NFC has excellent security due to high proximity and encryption technology. NFC forgoes a complicated pairing process of recognition of devices but allows devices to recognize one another within ⅒ second or less.

In particular, NFC is a smart card type contactless wireless communication technology where radio frequency identification (RFID) technology is utilized. In addition, NFC builds upon RFID technology by allowing two-way communication compared to smart cards. NFC has a relatively large memory storage space and offers more variety of services. Accordingly, commercialized electronic devices, such as smartphones and personal computers (PCs), in which the NFC technology is used, have recently been released.

SUMMARY OF THE INVENTION

The present general inventive concept provides an image forming apparatus supporting a near field communication (NFC) function and a method of performing setting an image job by using an NFC device.

The present general inventive concept also provides a computer-readable recording medium having embodied thereon a program to execute the method on a computer.

Additional features and utilities of the present general inventive concept will be set forth in part in the description which follows and, in part, will be obvious from the description, or may be learned by practice of the general inventive concept.

Exemplary embodiments of the present general inventive concept provide an image forming apparatus supporting a near field communication (NFC) function, the image forming apparatus including a control unit to execute an application to perform an image job, and an NFC module to tag a user device having the NFC function and to receive from the tagged user device a message comprising information stored in the tagged user device, wherein the control unit analyzes setting information regarding a set up of the image job based on the included information in the received message, and the image job is performed by executing the application by using the analyzed setting information.

The control unit may use the analyzed setting information to update a setting field of the application that is to be input via a user interface unit.

The user interface unit may display the updated setting field, wherein the updated setting field has to be input to execute the application, and wherein the user interface unit displays the analyzed setting information by updating the analyzed setting information in the displayed setting field when the user device is tagged.

When application is executed and requires an environment setting of the image forming apparatus for network connection of the image forming apparatus, the control unit may update the environment setting of the image forming apparatus by using the analyzed setting information.

The NFC module may receive the message after the application is executed by tagging the user device while being on standby for an input of a setting of the image job.

The control unit may include a message analyzing unit to parse an NFC data exchange format (NDEF) message that is received from the tagged user device via the NFC module, and a setting updating unit to update a setting field of the application by using the analyzed setting information in correspondence with an Application Type field included in a Payload field of a parsed NDEF message.

The received message may include address book information stored in the tagged user device, wherein the control unit updates a setting field of the application, and wherein the setting field of the application is to be input via a user interface unit by using the address book information.

The user interface may display a setting field for an email address when the image job is an operation of transmitting scan data to the email address, wherein the email address is included in the address book information, and wherein the control unit controls the user interface unit such that the email address that is included in the address book information is input in the displayed setting field and displayed.

The user interface unit may display a setting field for a phone number when the image job is a fax operation, wherein the phone number is included in the address book information, and wherein the control unit controls the user interface unit such that the phone number that is included in the address book information is input in the displayed setting field and displayed.

The received message may include text information written by using the tagged user device, and wherein the control unit updates a setting field for contents of an email by using the text information when the image job is an operation of transmitting scan data to an email address.

The image job may be an operation of establishing a connection between a network interface unit of the image forming apparatus and an external network, the NFC module may receive the message including information about a connection setting to establish a connection between the tagged user device and the external network, wherein the information is stored in the tagged user device, and wherein the control unit updates a setting field for a network connection by using information included in the received message about the connection setting.

The image job may be an operation of printing contents stored in the tagged user device or storing the contents in a document box of the image forming apparatus, the information included in the message may be received from the tagged user device may include connection setting information to establish a connection between a wireless communication module of the image forming apparatus and the tagged user device, the message being received via wireless communication, and wherein the control unit updates a setting field for the wireless communication by using the connection setting information.

Exemplary embodiments of the present general inventive concept also provide an image forming apparatus supporting a near field communication (NFC) function, the image forming apparatus including a scanning unit to generate scan data, an NFC module to transmit to a tagged user device having the NFC function, a message including connection setting information for wireless communication with the tagged user device, a control unit to control transmission of the generated scan data to the tagged user device when a connection of the wireless communication is established with the tagged user device, and a wireless communication module different from the NFC module to perform the wireless communication.

The connection setting information included in the transmitted message may include at least one of a media access control (MAC) address of the image forming apparatus and an Internet protocol (IP) address of the image forming apparatus.

The image forming apparatus may further include a user interface unit to display information indicating that tagging of the user device having the NFC function is necessary, after generating of the scan data has been completed.

Exemplary embodiments of the present general inventive concept also provide a method of performing setting of an image job by using a near field communication (NFC) device in an image forming apparatus that supports an NFC function, the method including executing an application to perform the image job, tagging a user device having the NFC function to receive a message comprising information stored in the tagged user device, analyzing setting information related to a set up of the image job based on the information in the received message, and controlling the performing of the image job by executing the application by using the analyzed setting information.

The controlling may include updating, via a user interface unit, a setting field of the application by using the analyzed setting information.

The method may further include displaying the setting field which has to be input to execute the application, and updating the analyzed setting information in the displayed setting field when the user device is tagged, the display the updated analyzed setting field.

The displayed setting field is a setting field for an email address when the image job is an operation of transmitting scan data to the email address, and may be a setting field for a phone number when the image job is a fax operation, wherein the updating of the analyzed setting information updates the analyzed setting information with address book information stored in the tagged user device.

When the application, which requires an environment setting of the image forming apparatus for network connection of the image forming apparatus, is executed, the controlling may include executing the application by updating the environment setting of the image forming apparatus by using the analyzed setting information.

The analyzed setting information may be information regarding connection setting to establish communication between the image forming apparatus and either the tagged user device or an external network.

The analyzing may include parsing an NFC data exchange format (NDEF) message that is received from the tagged user device via an NFC Module, wherein the controlling comprises executing the application by updating a setting field of the application by using setting information corresponding to an Application Type field included in a Payload field of the parsed NDEF message.

Exemplary embodiments of the present general inventive concept also provide a method of performing an image job by using a near field communication (NFC) device in an image forming apparatus supporting an NFC function, the method including generating scan data, transmitting, to a user device having the NFC function and that has been tagged, a message including connection setting information for wireless communication with the tagged user device, and controlling transmission of the generated scan data to the tagged user device when a connection of wireless communication is established with the tagged user device, wherein the wireless communication is performed by using a wireless communication module that is different from an NFC module that is performing the transmitting of the message including the connection setting information.

A non-transitory computer readable recording medium may contain computer-readable codes as a program to execute the method of performing setting of an image job described above.

A non-transitory computer readable recording medium may contain computer-readable codes as a program to execute the method of performing an image job described above.

The image forming apparatus may further include an NFC tag inserted into at least one of the image forming apparatus and the tagged user device to enable the NFC function.

Performance information of the image forming apparatus may be written to the NFC tag, the performance information including at least one of device identification information, print capacity, scan capacity, fax capacity, and location information of the image forming apparatus.

The NFC function may be performed when the tagged user device is within about 10 centimeters of the image forming apparatus.

The NFC function may be performed according to at least one of ISO 14443 Type A Proximity-card standard, ISO 14443 Type B Proximity-card standard, FeliCa standard, and ISO 15693 standard.

The NFC function may be performed according to at least one of a reader/writer mode, a peer to peer mode, and a card emulation mode.

The reader/writer mode may be performed according to a Record Type Definition protocol or an NFC Data Exchange Format (NDEF) protocol, the peer to peer mode may be performed according to a Logical Link Control protocol, and the card emulation mode may be performed according to a Card Emulation protocol.

The image forming apparatus may further include at least one of a scanner to scan image data, a fax module to transmit image data, and a print engine to print image data.

The received message may include text information written by using the tagged user device, wherein the control unit updates a setting field for a subject line of an email by using the text information when the image job is an operation of transmitting scan data to an email address.

The method of performing setting of an image job may further include receiving connection setting information from the tagged user device to establish wireless communication between the image forming apparatus and the tagged user device, receiving contents from the tagged user device via the wireless communication, and performing at least one of printing the contents and storing the contents in a document box of the image forming apparatus.

Exemplary embodiments of the present general inventive concept also provide an image forming apparatus supporting a near field communication (NFC) function, the image forming apparatus including an NFC module to tag a user device having the NFC function and to exchange information with the tagged user device regarding an image job having a setup, and a control unit to control the performance of the image job and the setup according to the exchanged information.

The image forming apparatus may further include an image forming unit to generate an image, the image including at least one of scan data obtained by scanning an image and print data obtained by printing an image, wherein the image job comprises generating the image with the image forming unit.

The setup may include configuring the image forming unit to perform the image job, wherein the control unit analyzes the information exchanged with the tagged user device and controls the image forming unit to perform the image job according to the analyzed information.

The setup may include configuring wireless communication between the image forming apparatus and the tagged user device, wherein the image job includes transmitting image data via the wireless communication to the tagged user device.

Exemplary embodiments of the present general inventive concept also provide a method of performing an image job in an image forming apparatus that supports a near field Communication (NFC) function, the method including tagging a user device having an NFC function, exchanging information with the tagged user device regarding an image job having a setup, and controlling performance of the image job and the setup according to the exchanged information.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 9 illustrates an operation of setting a simple mail transfer protocol (SMTP) server of a network connection application of an image forming apparatus by using a user device having an NFC function according to an exemplary embodiment of the present general inventive concept;

DETAILED DESCRIPTION OF THE EMBODIMENTS

Figure 1A:
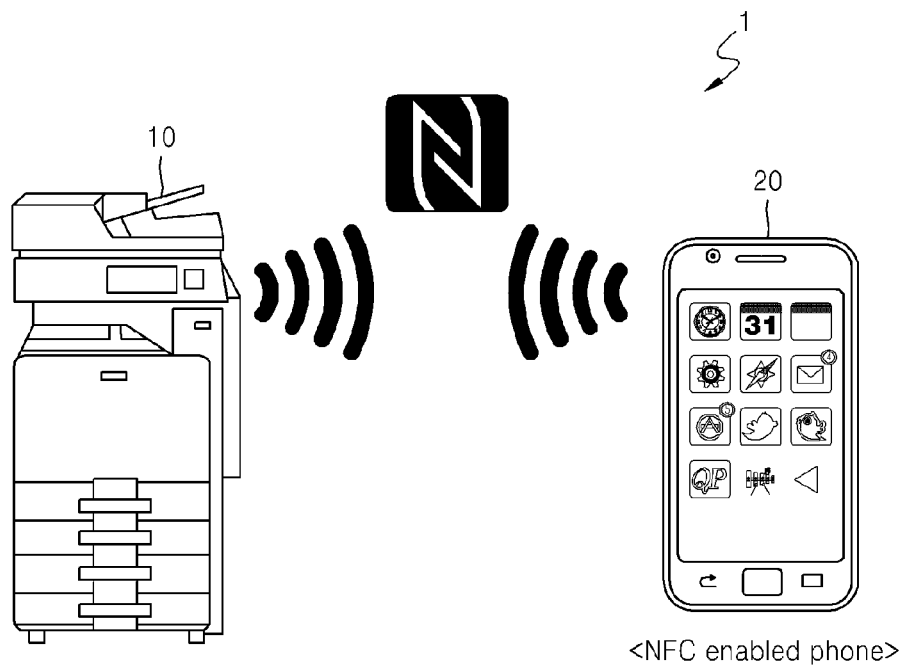
FIG. 1A illustrates a near field communication (NFC) environment according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Expressions such as "at least one of," when preceding a list of elements, modify the entire list of elements and do not modify the individual elements of the list.

FIG. 1A illustrates a near field communication (NFC) environment 1 according to an exemplary embodiment of the present general inventive concept. Referring to FIG. 1A, an image forming apparatus 10 and a user device 20 (such as a smartphone) each supporting an NFC function are present in the NFC environment 1. An NFC tag 30 (illustrated in FIG. 1B) is embedded in the image forming apparatus 10 illustrated in FIG. 1 in advance, and thus communication between the image forming apparatus 10 and the user device 20 may be performed via NFC.

Figure 1B:
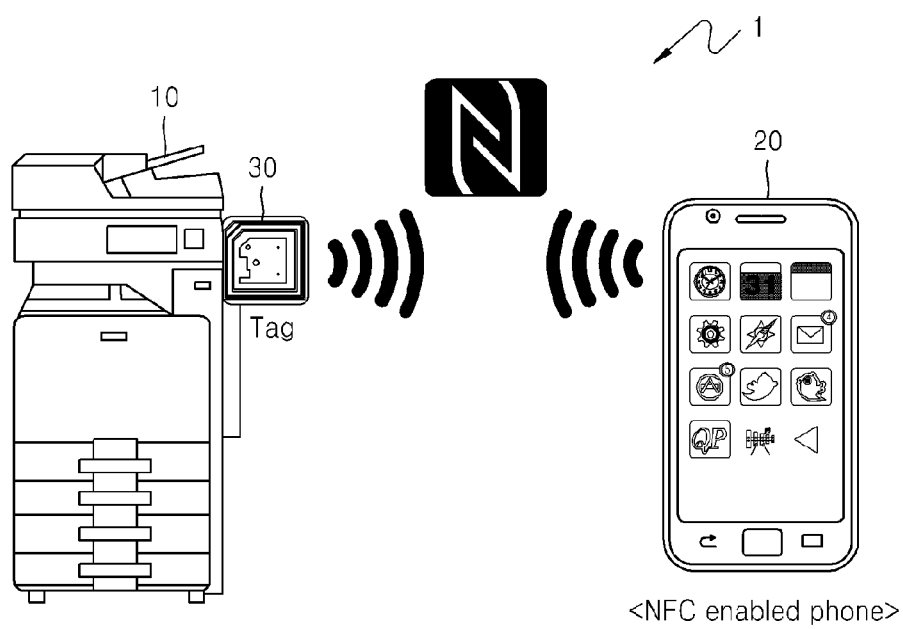
FIG. 1B illustrates an NFC environment which is similar to that of FIG. 1A, according to another exemplary embodiment of the present general inventive concept.
Figure 1C:
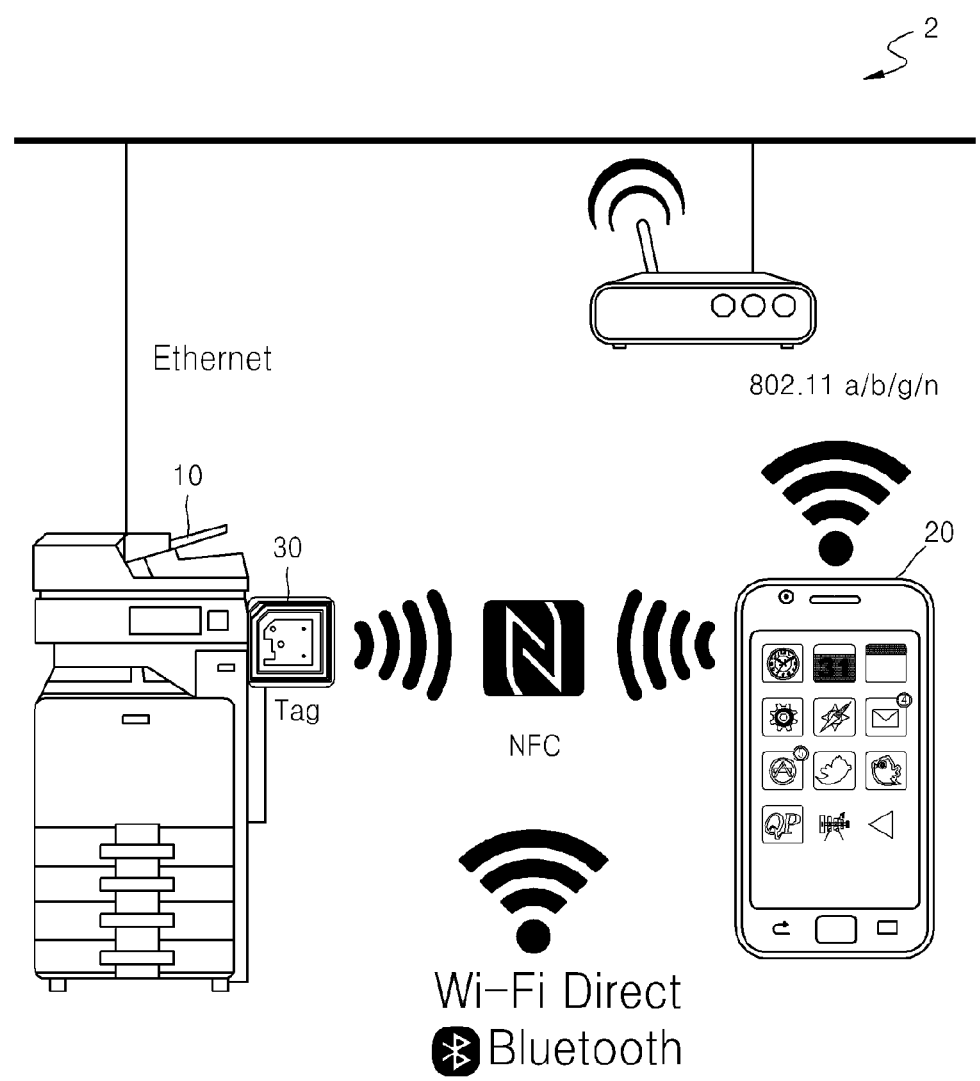
FIG. 1C illustrates a wireless communication environment in which an image forming apparatus and a user device are present, according to an exemplary embodiment of the present general inventive concept.

FIG. 1B illustrates an NFC environment 1 which is similar to the NFC environment 1 FIG. 1A, according to an exemplary embodiment of the present general inventive concept. Referring to FIG. 1B, an image forming apparatus 10 and a user device 20 each supporting an NFC function are also present in the NFC environment 1. In particular, an NFC tag 30 is embedded in advance in the image forming apparatus 10 of FIG. 1A, whereas no NFC tag 30 is embedded in the image forming apparatus 10 in FIG. 1B in advance. Accordingly, the image forming apparatus 10 of FIG. 1B may communicate with the user device 20 via NFC only when an NFC tag 30 is installed later in the image forming apparatus 10 of FIG. 1B.

However, it will be understood by one of ordinary skill in the art that if an NFC tag 30 is installed later in the image forming apparatus 10 of FIG. 1B, then an operation of the NFC environment 1 of the current exemplary embodiment is identical to that of the NFC environment 1 of FIG. 1A, in which the NFC tag 30 is embedded in advance.

While just one pair of devices, that is, the image forming apparatus 10 and the user device 20, is present in the NFC environment 1 illustrated in FIGS. 1A and 1B for convenience of description, more electronic devices of different types that support an NFC function may also be present in the NFC environment 1. These devices may also operate in the same manner of NFC as in the current exemplary embodiment of the present general inventive concept, which would be understood by one of ordinary skill in the art.

Figure 10:
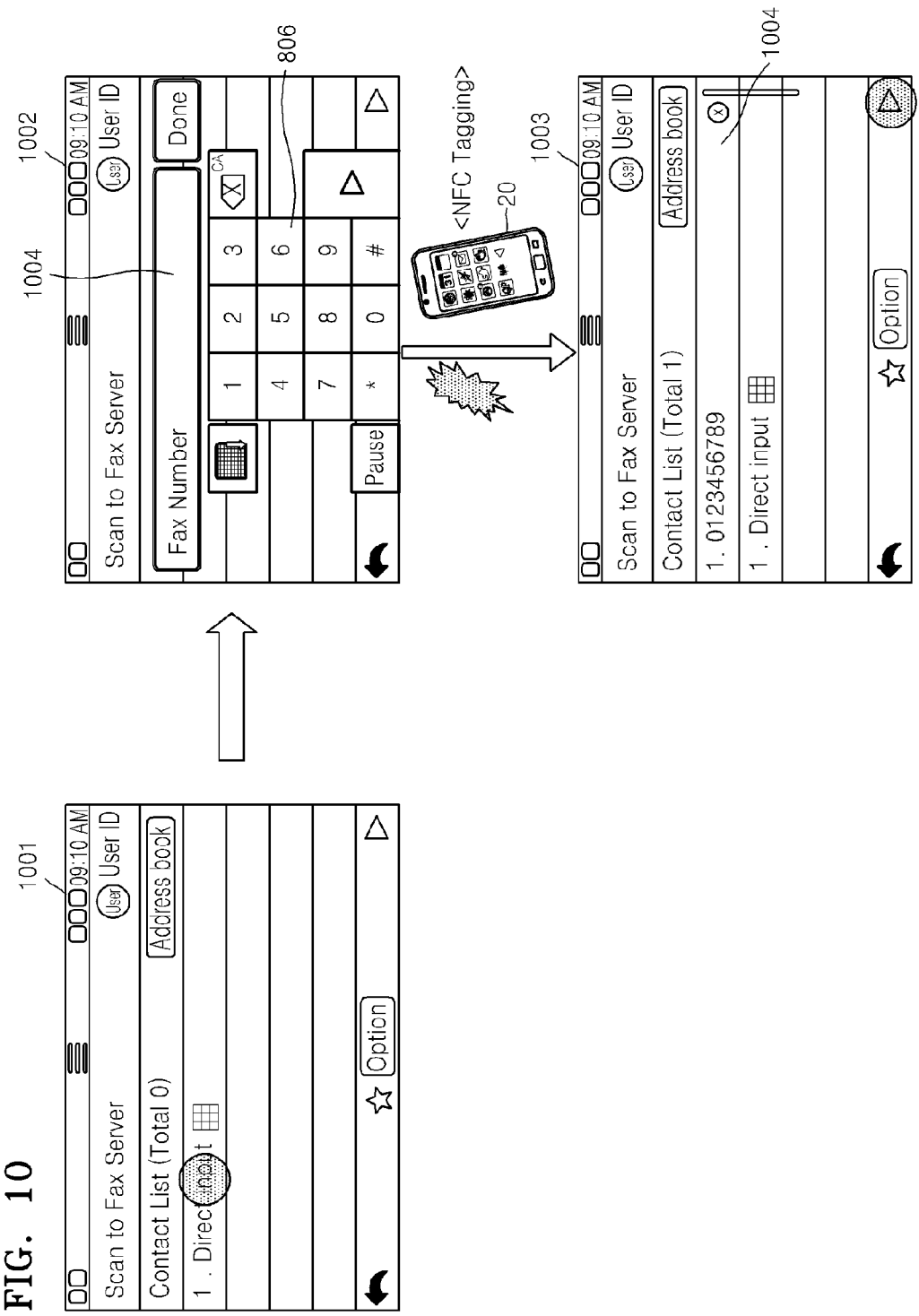
FIG. 10 illustrates an operation of setting a scan-to-fax application of an image forming apparatus by using a user device having an NFC function according to an exemplary embodiment of the present general inventive concept.

FIG. 10 illustrates an alternative wireless communication environment 2 according to another exemplary embodiment of the present general inventive concept, in which an image forming apparatus 10 and a user device 20 are present. Referring to FIG. 10, other peripheral wired/wireless networks are illustrated in addition to the NFC environment 1 of FIG. 1A or 1B. The NFC environment 1 may operate in combination with peripheral wired/wireless networks, such as Wi-Fi Direct, Bluetooth, Ethernet, 802.11a/b/g/n, etc.

Before describing the exemplary embodiments of the present general inventive concept in detail, NFC technology will be described.

NFC is a contactless short-range wireless communication standard between electronic devices within a short distance of 10 cm with low power consumption by using a frequency of 13.56 MHz. A data transfer rate of NFC is 424 Kbps, and NFC has excellent security due to high proximity and encryption technology. NFC forgoes a complicated pairing process of recognition of devices but allows devices to recognize one another within ⅒ second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

In detail, NFC is a wireless communication method in which data is directly exchanged between terminals, for example, between the image forming apparatus 10 and the user device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmit the same to a reader. NFC allows a tag function according to necessity but also supports a function of recording information on the tag, and may be used in peer to peer (P2P) data exchange between terminals in which NFC is set.

Figure 2A:
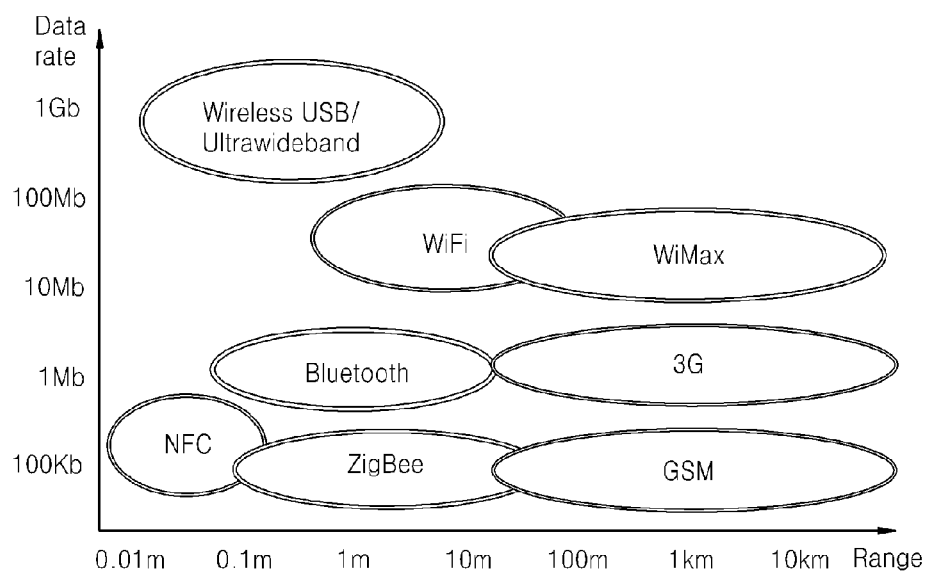
FIG. 2A is a graph comparing data rates and communication ranges of NFC and other wireless communication methods.

NFC which is developed based on RFID may be compared with other wireless communication methods, such as Wi-Fi Bluetooth, ZigBee, etc., as illustrated in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as described in Table 1 below.

TABLE 1

| Technology | Frequency used | security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency. For example, when NFC and Bluetooth technology are combined, NFC may be used in connecting terminals (authorization) and Bluetooth may be used in data transmission between the terminals to thereby enable more efficient communication between the devices.

Figure 2B:
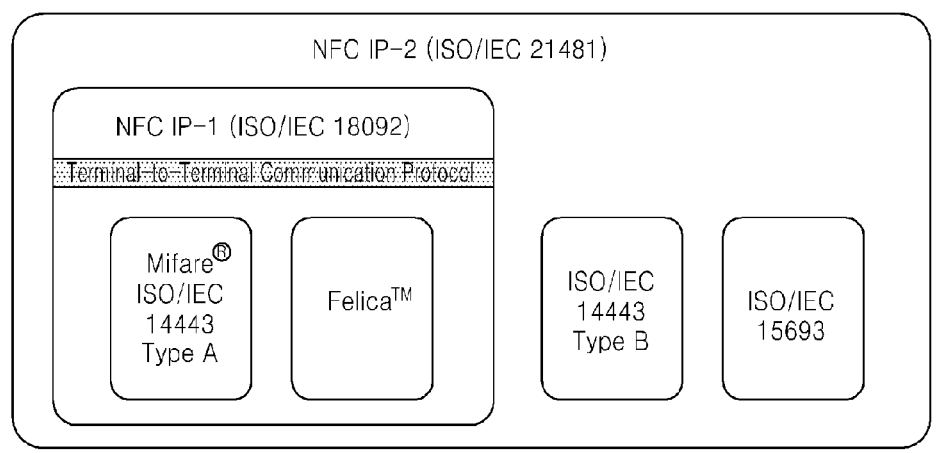
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1(NFC Interface Protocol-1)(ISO/IEC 18092) and NFC IP-2(ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
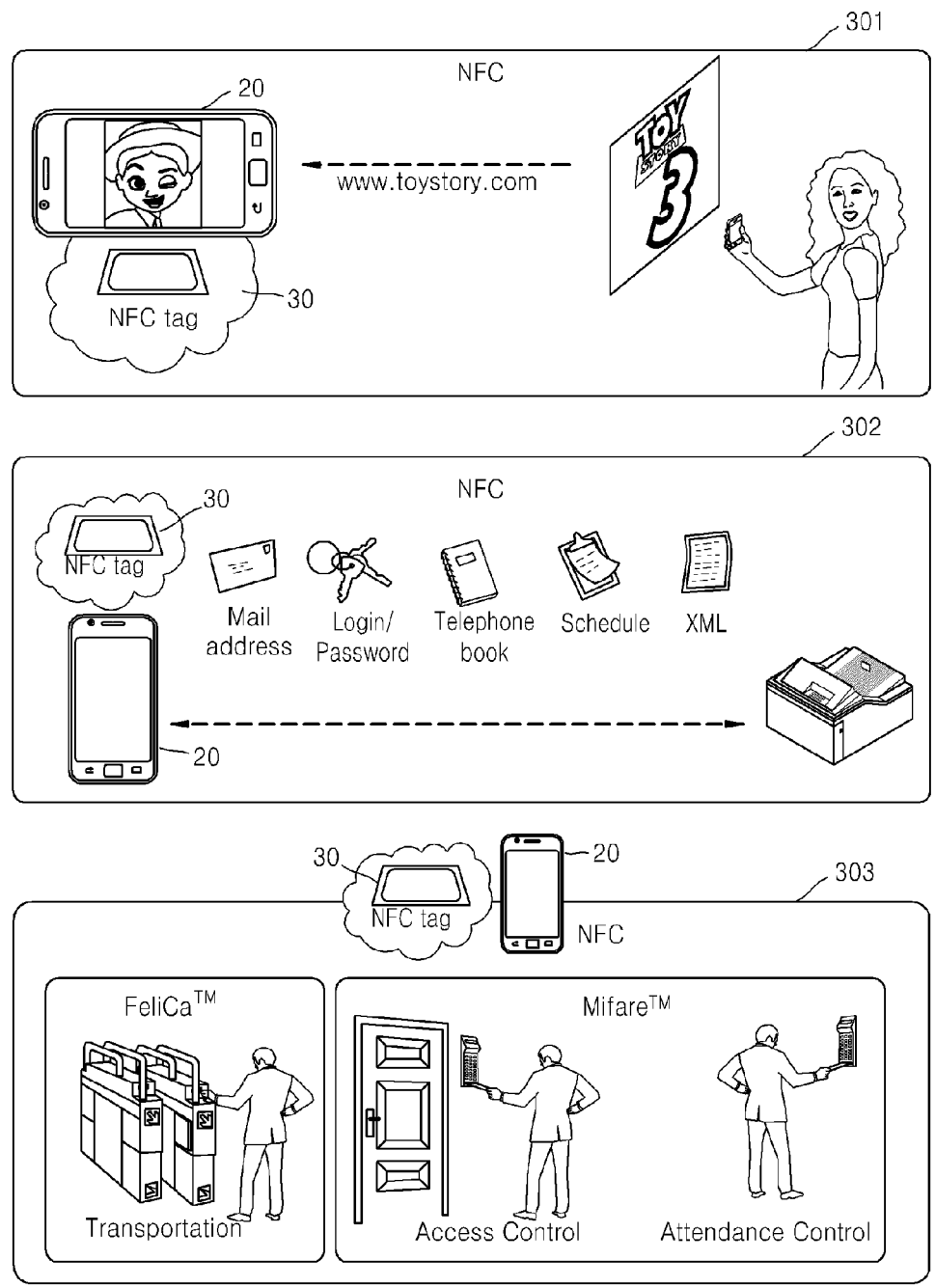
FIGS. 3A and 3B are diagrams to explain three communication modes of NFC.
Figure 3B:
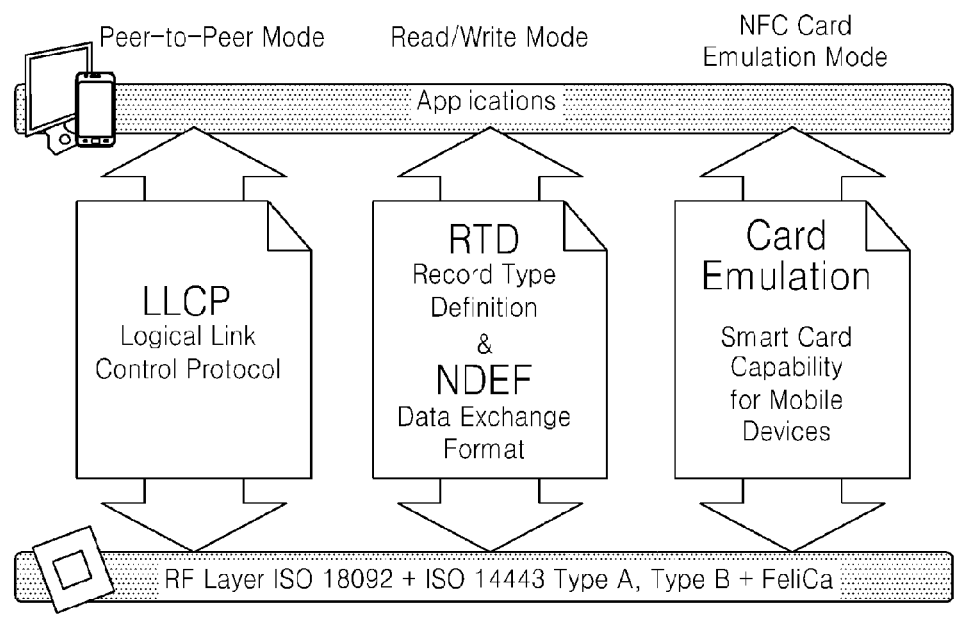

FIGS. 3A and 3B are diagrams to explain three communication modes of NFC.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below. For the purposes of Table 2, a VCD (Vicinity Coupling Device) may carry out the function of the Reader/Writer mode, while a PCD (Proximity Coupling Device) may carry out the function of Card Emulation mode.

TABLE 2

| | ISO/IEC 15693 | ISO/IEC 18092 | ISO/IEC 14443 |
| --- | --- | --- | --- |
| Operational mode | communication between reader and tag (VCD, Reader/Writer mode) | communication between devices (P2P mode) | communication between reader and tag (PCD, Card Emulation mode) |
| Power supply | Manual | active and manual | manual |
| Range of communication | 1 m | 10-20 cm | 10 cm |
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 301 supports that the user device 20, in which an NFC tag 30 is embedded, operates as a reader for reading another NFC tag 30 or operates as a writer for inputting information to another NFC tag 30 (ISO/IEC 15693).

In the P2P mode 302, communication at a link level between two NFC terminals, for example, between the image forming apparatus 10 and the user device 20, is supported (ISO/IEC 18092). To establish a connection, a client (NFC P2P initiator, the user device 20) searches for a host (NFC P2P target, the image forming apparatus 10) and transmits data of an NDEF message format. In the P2P mode 302, data, such as emails, login/password information, schedules, telephone numbers, and XML data, may be exchanged just by touching the image forming apparatus 10 with the user device 20.

Finally, in the Card Emulation mode 303, the user device 20, in which an NFC tag 30 is embedded, operates as a smart card (ISO/IEC 14443). Accordingly, NFC is compatible not only with ISO 14443, which is the international standard for contactless cards, but also with FeliCa by Sony and MiFare by Philips.

In order to coordinately provide the three communication modes of NFC, a protocol is standardized as illustrated in FIG. 3B. Referring to FIG. 3B, a software structure in an NFC system is illustrated.

Logical Link Control Protocol (LLCP) is a protocol that sets a communication connection between layers and controls the same. An NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record Type Definition (RTD) defines a record type and a type name which may correspond to an NDEF record. Card Emulation is a protocol by which a user device 20 having an NFC function, such as a smartphone with an NFC tag 30, can duplicate the functions of a conventional smart card.

Figure 4:
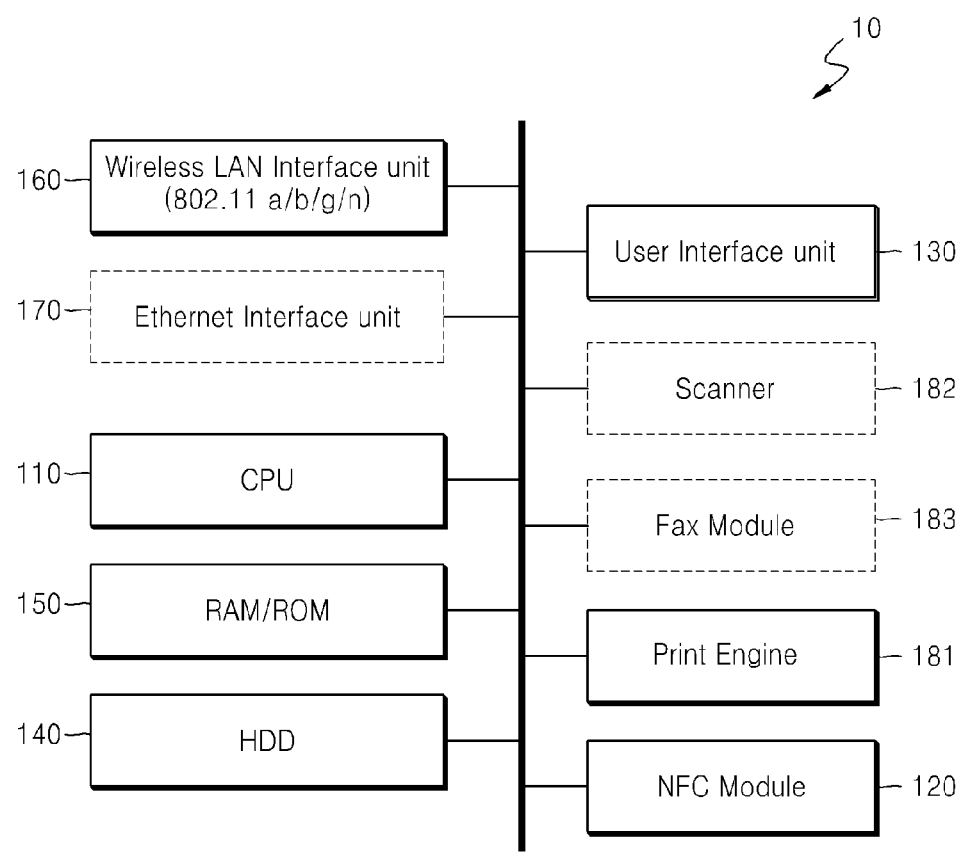
FIG. 4 is a block diagram illustrating a basic hardware structure of an image forming apparatus supporting an NFC function, according to an exemplary embodiment of the present general inventive concept.

FIG. 4 is a block diagram illustrating a basic hardware structure of the image forming apparatus 10 supporting an NFC function, according to an exemplary embodiment of the present general inventive concept. Referring to FIG. 4, the image forming apparatus 10 may include a central processing unit (CPU) 110, an NFC module 120, a user interface unit 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 10 supports only WLAN, the Ethernet interface unit 170 may not be included. Also, if the image forming apparatus 10 is a printer, the scanner 182 and the fax module 183 may not be included.

The CPU 110 controls the overall operation of the image forming apparatus 10, and information needed for controlling and print data is stored in the HDD 140 and the RAM/ROM 150 and read therefrom when necessary.

The user interface unit 130 is hardware used as a medium for the user when the user checks information of the image forming apparatus 10 and inputs a command to the image forming apparatus 10. The user interface unit 130 may be designed in various manners according to products. For example, it may be formed in a simple form of two or four lines on a display, such as a liquid crystal display (LCD) or light emitting diode (LED), or as a graphic user interface (GUI), so as to enable various graphical representations.

The WLAN interface unit 160 refers to hardware that performs IEEE 802.11a/b/g/n functionality, and may communicate with a main board of the image forming apparatus 10 via a universal serial bus (USB) or the like. The WLAN interface unit 160 may also support Wi-Fi Direct at the same time.

The Ethernet interface unit 170 refers to hardware that performs wired Ethernet communication according to IEEE 802.3.

The print engine 181, the scanner 182, and the fax module 183 refer to hardware to perform a printing function, a scan function, and a fax function, respectively.

In particular, the image forming apparatus 10 includes the NFC module 120 to thereby communicate with other NFC devices, such as the user device 20, via NFC. The NFC module 120 is in charge of the NFC function and may read from or write data to an NFC tag 30. Also, communication with the main board of the image forming apparatus 10 is performed by using a Universal Asynchronous Receiver/Transmitter (UART), an Inter Integrated Circuit (I2C), a Serial Peripheral Interface Bus (SPI), or the like (not illustrated). As described above with reference to FIGS. 1A and 1B, the NFC module 120 may be embedded in the image forming apparatus 10 in advance at the time of factory shipment, or may be available when the user installs the NFC tag 30 later.

Although not illustrated in FIG. 4, the image forming apparatus 10 may also include other wireless communication modules, such as a Bluetooth module or a ZigBee module.

Figure 5:
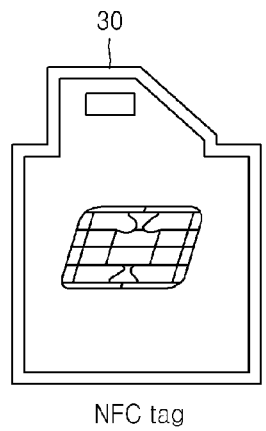
FIG. 5 illustrates an NFC tag and information stored in the NFC tag installed in the image forming apparatus of FIG. 1B.

FIG. 5 illustrates the NFC tag 30 installed in the image forming apparatus 10 of FIG. 1B and information 510 stored in the NFC tag 30. Referring to FIG. 5, in the case of the image forming apparatus 10 of FIG. 1B, the NFC function may be utilized when the NFC tag 30 is inserted into a slot (not illustrated) that is provided in advance in the image forming apparatus 10. The information 510 of the NFC tag 30, for example, performance information of the image forming apparatus 10, may be recorded by other NFC devices in the Reader/Writer mode 301 or may be stored in advance by a manager.

An image forming apparatus 60 supporting an NFC function according to an exemplary embodiment of the present general inventive concept and detailed functions and operations thereof in regards to a method of performing setting of an image job by using an NFC device and a scan-to-NFC function of the image forming apparatus 60 will be described in detail with reference to the drawings below.

Figure 6A:
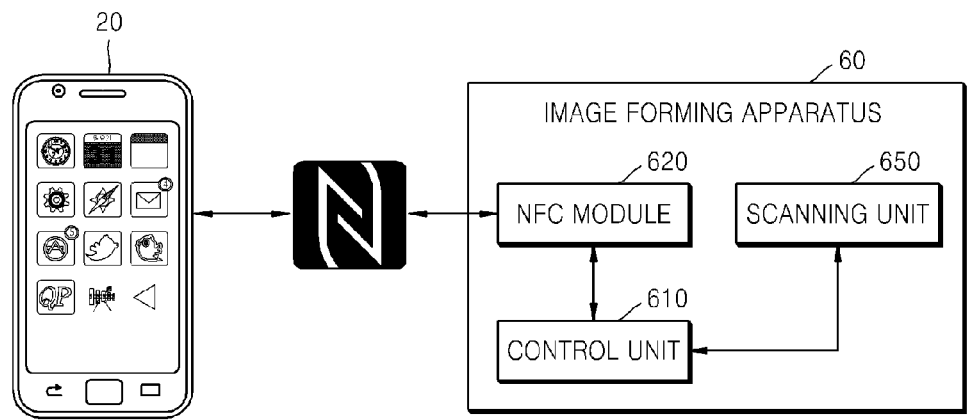
FIG. 6A is a block diagram illustrating a hardware structure of an image forming apparatus that supports a scan-to-NFC function, according to an exemplary embodiment of the present general inventive concept.

FIG. 6A is a block diagram illustrating a hardware structure of an image forming apparatus 60 that supports a scan-to-NFC function, according to an exemplary embodiment of the present general inventive concept.

In FIG. 6A, only hardware components related to the current exemplary embodiment of the present general inventive concept will be described in order to prevent obscuring the characteristics of the current exemplary embodiment. However, it will be understood by one of ordinary skill in the art that general-use hardware components other than the illustrated hardware components in FIG. 6A may also be included.

Referring to FIG. 6A, the image forming apparatus 60 is illustrated as including just hardware components related to the current exemplary embodiment from among the hardware components of the image forming apparatus 10 illustrated in FIG. 4. However, it will be understood by one of ordinary skill in the art that elements that are omitted in FIG. 6A but described with reference to the image forming apparatus 10 of FIG. 4 may also be applied to the image forming apparatus 60.

The image forming apparatus 60 includes a control unit 610, an NFC module 620, and a scanning unit 650. Referring to FIG. 6A, the control unit 610 corresponds to the CPU 110 of FIG. 4, the NFC module 620 corresponds to the NFC module 120 of FIG. 4, and the scanning unit 650 corresponds to the scanner 182 illustrated in FIG. 4.

According to the current exemplary embodiment of the present general inventive concept, the scan-to-NFC function will be understood as a function of transmitting scan data generated by using the scanning unit 650 of the image forming apparatus 60, to an external NFC device (e.g., the user device 20, such as a smartphone) via the NFC module 620.

In order to activate a scan-to-NFC function, a user interface unit 640 included in the image forming apparatus 60 (illustrated in FIG. 7, and corresponding to the user interface unit 130 of FIG. 4) receives information from a user to execute the scan-to-NFC function.

The scanning unit 650 scans an original document (not illustrated) placed on the image forming apparatus 60 to generate scan data. A scanning function of the image forming apparatus 60 is well-known to one of ordinary skill in the art, and thus, detailed description thereof will be omitted.

Meanwhile, a storage unit (not illustrated, e.g., the HDD 140 of FIG. 4) may temporarily store the generated scan data before it is transmitted.

When generation and storage of scan data is completed, the user interface unit 640 may display information indicating that tagging of the user device 20 is necessary, for example, a message such as "Tag your device."

The NFC module 620 recognizes access by the user device 20 having an NFC function according to an NFC protocol. In order to activate the NFC function and establish a connection, a predetermined NFC device corresponding to a client (e.g., the user device 20) has to access another NFC device corresponding to a host (e.g., the image forming apparatus 60) within a proximity range of 10 cm.

Accordingly, the NFC module 620 tags the user device 20 by recognizing the access by the user device 20.

Here, wireless communication may be NFC implemented by using the NFC module 620 or wireless communication via wireless communication modules 6301 (illustrated in FIG. 7) other than the NFC module 620, for example, wireless communication via a Wi-Fi Direct module (not illustrated) having a Wi-Fi Direct function. Wireless communication modules 6301 other than the NFC module 620 may be used because the other wireless communication modules 6301 such as Wi-Fi Direct modules may be more efficient for data transmission of a large amount data in comparison to the NFC module 620 when considering data size of scan data. However, it would be understood by one of ordinary skill in the art that a wireless communication module 6301 according to the current exemplary embodiment is not limited to any one type of a wireless communication module 6301.

Transmission of scan data by using the NFC module 620 will be described now. When a wireless communication connection between the NFC module 620 and the user device 20 is set, the control unit 610 controls the NFC module 620 to transmit the generated scan data to the user device 20 via the NFC module 620.

In this case, the NFC module 620 may include scan data in an NDEF message defined according to NFC standards, and transmit the same to the user device 20.

However, transmission of scan data by using other wireless communication modules 6301 instead of the NFC module 620 (e.g., a Wi-Fi Direct module) is as follows.

When the user device 20 is tagged, the NFC module 620 transmits an NDEF message including connection setting information for wireless communication with respect to the user device 20, to the user device 20.

Here, the connection setting information included in the NDEF message includes network information of the image forming apparatus 60 such as a MAC address or an Internet protocol (IP) address of the image forming apparatus 60 needed for Wi-Fi Direct connection between the user device 20 and the image forming apparatus 60.

The NDEF message transmitted to the user device 20 will be described in further detail. The NFC module 620 transmits an NDEF message, in which a Type Name Format (TNF) field is set as an unknown type, an Application type field is set as contents, and connection setting information of the image forming apparatus 60 is included in a Payload field, to the user device 20.

Next, the image forming apparatus 60 receives a request for Wi-Fi Direct connection from the user device 20 that has received the NDEF message. When the image forming apparatus 60 allows the request for Wi-Fi Direct connection of the user device 20, a wireless communication connection between the image forming apparatus 60 and the user device 20 is established.

When wireless communication connection of Wi-Fi Direct is established, the control unit 610 controls the NFC module 620 to transmit the generated scan data to the user device 20, thereby completing the scan-to-NFC function of the image forming apparatus 60.

Figure 6B:
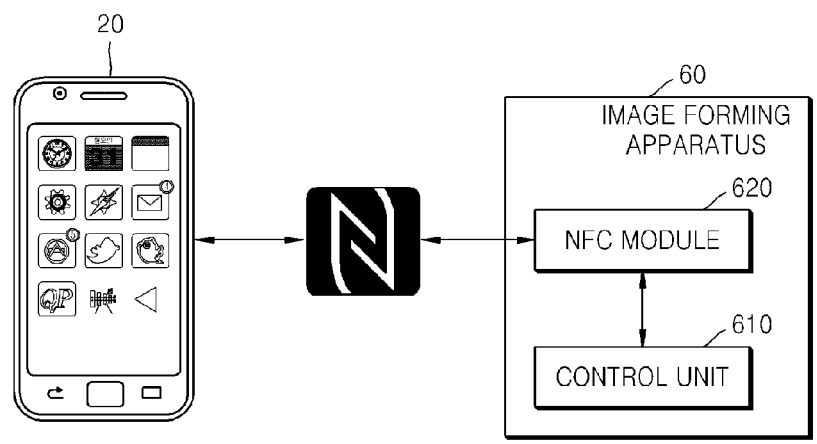
FIG. 6B is a block diagram illustrating a hardware structure of an image forming apparatus that performs setting of an image job by using an NFC device according to an exemplary embodiment of the present general inventive concept.

FIG. 6B is a block diagram illustrating a hardware structure of an image forming apparatus 60 that performs setting of an image job by using an NFC device according to an exemplary embodiment of the present general inventive concept.

In FIG. 6B, only hardware components related to the current exemplary embodiment of the present general inventive concept will be described in order to prevent obscuring the characteristics of the current exemplary embodiment. However, it will be understood by one of ordinary skill in the art that general-use hardware components other than the illustrated hardware components of FIG. 6B may also be included.

Referring to FIG. 6B, the image forming apparatus 60 is illustrated as including just hardware components related to the current exemplary embodiment from among the hardware components of the image forming apparatus 10 illustrated in FIG. 4. However, it will be understood by one of ordinary skill in the art that elements that are omitted in FIG. 6B but described with reference to the image forming apparatus 10 of FIG. 4 may also be applied to the image forming apparatus 60.

The image forming apparatus 60 includes a control unit 610 and an NFC module 620. Referring to FIG. 6B, the control unit 610 corresponds to the CPU 110 of FIG. 4, and the NFC module 620 corresponds to the NFC module 120 of FIG. 4.

The control unit 610 executes an application to perform an image job.

When an application related to a predetermined image job is executed, the NFC module 620 tags the user device 20 having an NFC function. Then, the NFC module 620 receives a message including information stored in the user device 20. As described above, the message is an NDEF message defined according to the NFC standards.

The control unit 610 analyzes setting information related to a set up of an image job based on the information included in the message received from the NFC module 620. Then, the control unit 610 performs an image job by executing an application by using the analyzed setting information.

That is, the image forming apparatus 60 may remotely perform a set up related to an image job that is to be performed by using the information that is written by the user device 20 and stored therein.

Figure 7:
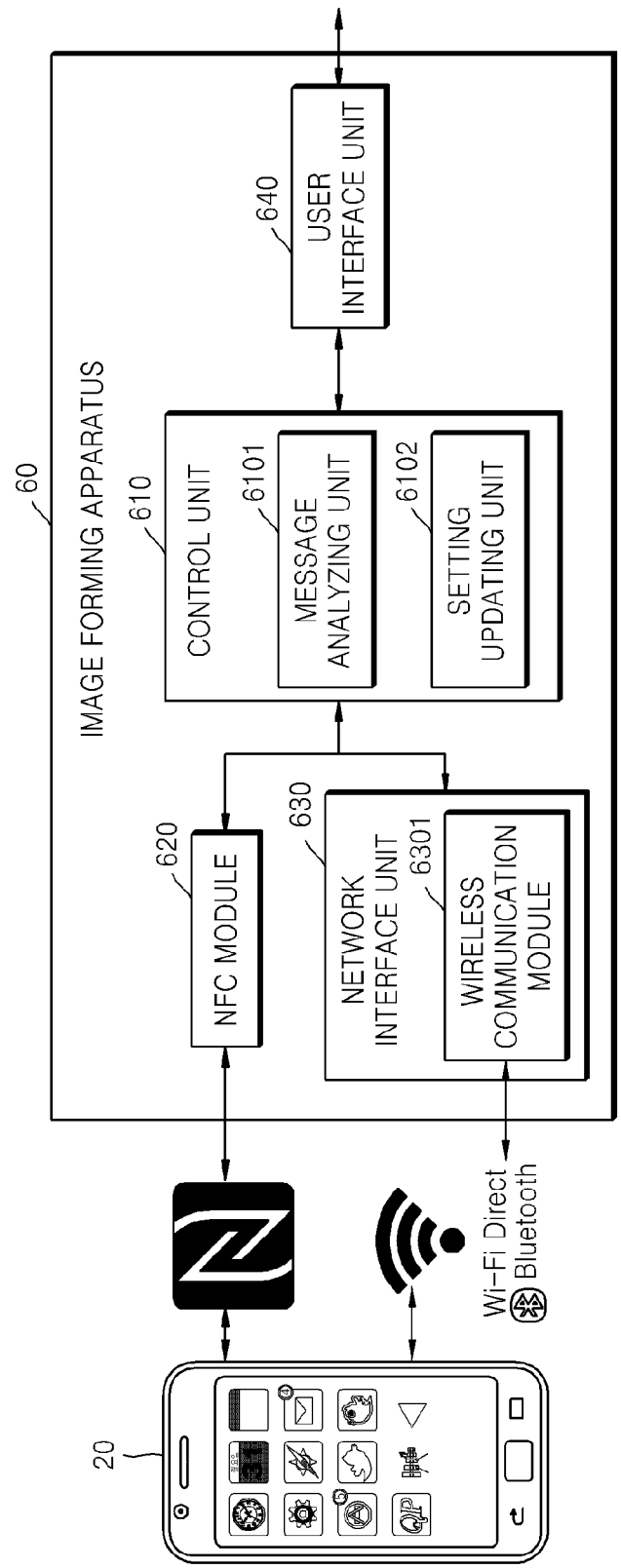
FIG. 7 is a detailed structural diagram illustrating an image forming apparatus that performs setting of an image job by using an NFC device according to an exemplary embodiment of the present general inventive concept.

FIG. 7 is a detailed structural diagram illustrating the image forming apparatus 60 that performs setting of an image job by using an NFC device according to an exemplary embodiment of the present general inventive concept. FIG. 7 is a detailed structural diagram of the image forming apparatus 60 illustrated in FIG. 6B.

In FIG. 7, only hardware components related to the current exemplary embodiment of the present general inventive concept will be described in order to prevent obscuring the characteristics of the current exemplary embodiment. However, it will be understood by one of ordinary skill in the art that general-use hardware components other than the illustrated hardware components of FIG. 7 may also be included.

Referring to FIG. 7, the image forming apparatus 60 is illustrated as including just hardware components related to the current exemplary embodiment from among the hardware components of the image forming apparatus 10 illustrated in FIG. 4. However, it will be understood by one of ordinary skill in the art that elements that are omitted in FIG. 7 but described with reference to the image forming apparatus 10 of FIG. 4 may also be applied to the image forming apparatus 60.

The image forming apparatus 60 includes a control unit 610, an NFC module 620, a network interface unit 630, and a user interface unit 640. The control unit 610 includes a message analyzing unit 6101 and a setting updating unit 6102, and the network interface unit 630 includes a wireless communication module 6301. Referring to FIG. 7, the control unit 610 corresponds to the CPU 110 illustrated in FIG. 4, and the NFC module 620 corresponds to the NFC module 120 illustrated in FIG. 4, and the network interface unit 630 corresponds to the WLAN interface unit 160 and the Ethernet interface unit 170, and the user interface unit 640 corresponds to the user interface unit 130 illustrated in FIG. 4. Meanwhile, the wireless communication module 6301 refers to any hardware that uses wireless communication methods other than NFC, such as a Bluetooth module or a ZigBee module.

In general, according to the conventional art, a user directly sets up an image job via an input unit included in an image forming apparatus. However, a desired menu needs to be searched for or a large amount of information has to be input via a conventional user interface screen having a limited size, such as a screen two or four lines high, a 4.3 inch screen or a 7 inch screen, or by using an input device having a limited number of buttons. Accordingly, the user is inconvenienced by having to input numbers, alphabets, special characters or the like, in various stages, over a long period of time. That is, to set up an image job, a user either must go through various menu screens or individually input a large amount of information.

However, according to the image forming apparatus 60 of the current exemplary embodiment of the present general inventive concept, just by tagging the user device 20 via an NFC function, set up of an image job may be performed by using the information stored in the user device 20. Hereinafter, the function and operation of the image forming apparatus 60 will be described in detail.

The control unit 610 executes an application installed in the image forming apparatus 60 to perform an image job.

An application of the image forming apparatus 60 according to the current exemplary embodiment of the present general inventive concept refers to an application used to perform an image job, such as a scan-to-email function, a scan-to-fax function, a scan-to-server function, a document box job, or a server setting operation. However, it will be understood by one of ordinary skill in the art that the application according to the current exemplary embodiment of the present general inventive concept is not limited to the listed operations.

When an application is being executed, the user interface unit 640 may display a user interface screen related to driving of the application. On this user interface screen, a setting field which requires a user input to execute an application may be displayed.

The NFC module 620 recognizes access by the user device 20 according to an NFC protocol. In order to activate an NFC function and establish a connection, the user device 20 corresponding to a client has to access the image forming apparatus 60 corresponding to a host within a proximity range of 10 cm. Accordingly, the NFC module 620 recognizes access by the user device 20 and tags the user device 20.

The NFC module 620 receives a message including the information stored in the user device 20. Here, the message may correspond to an NDEF message defined by the NFC standards.

Here, a time point when the NFC module 620 tags the user device 20 may be while being on standby waiting for an input of a setting of an image job via a user interface screen of an application after the execution of the application has been initiated.

Meanwhile, the NDEF message transmitted from the user device 20 may include various types of information. For example, if an image job is a scan-to-email operation or a scan-to-fax operation, address book information such as an email address, a phone number or the like stored in the user device 20 may be included in the NDEF message. Also, when an image job requires an environment setting (configuration) for network connection of the image forming apparatus 60, information about a connection setting of the user device 20 stored in the user device 20 may be included in the NDEF message.

The control unit 610 analyzes setting information related to a set up of an image job from the information included in the received message, and controls an image job to be performed by executing the application by using the analyzed setting information.

In particular, the control unit 610 updates, by using the analyzed setting information, a setting field of an application that is to be input via the user interface unit 640.

As described above, the control unit 610 may include the message analyzing unit 6101 and the setting updating unit 6102.

The control unit 610 may be implemented by typically used processors.

That is, the control unit 610 may be implemented as an array of a plurality of logic gates, or as a combination of memories in which a general-use micro-processor and programs that may be executed in the general-use micro-processor are stored. Also, the control unit 610 may be implemented as a module of an application program. Furthermore, it would be understood by one of ordinary skill in the art that the control unit 610 may also be implemented as another type of hardware that may be implemented using operations that will be described with reference to the current exemplary embodiment of the present general inventive concept.

The message analyzing unit 6101 parses the NDEF message that is received from the user device 20 via the NFC module 620.

In detail, the message analyzing unit 6101 parses a header portion of the received NDEF message. If a TNF field of the header portion is an unknown type, the message analyzing unit 6101 parses a payload of the NDEF message. Otherwise, the message analyzing unit 6101 ignores the received NDEF message.

As a result of parsing the payload, if the parsed payload is a recognizable format, the message analyzing unit 6101 parses an Application Type field, and parses a Payload Body field.

The setting updating unit 6101 updates a setting field of an application by using the setting information included in the parsed Application Type field and the parsed Payload Body field.

An example where the parsed Application Type field is an address book will be described below.

The setting updating unit 6102 updates a setting field related to an address of a scan-to-email application. If the parsed Application Type field is an address book and the parsed Payload Body field is an email address, the setting updating unit 6102 updates a setting field of an email address of a scan-to-email application. Alternatively, when the parsed Application Type field is an address book and the parsed Payload Body field is a fax number, the setting updating unit 6102 updates a setting field of a fax number of a scan-to-fax application. Alternatively, when the parsed Application Type field is an address book and the parsed Payload Body field is text, the setting updating unit 6102 updates a setting field of a subject or an email body of a scan-to-email application.

Alternatively, an example where the parsed Application Type field is an environment setting (Configuration) of a network connection will be described below.

The setting updating unit 6102 updates a setting field related to a connection setting of a network connection application. Here, the connection setting may correspond to a set up for connection with respect to a server (not illustrated). According to the current exemplary embodiment of the present general inventive concept, a server corresponds to a server needed for the image forming apparatus 60 to communicate with an external network, and examples thereof may include a file transfer protocol (FTP) server, a server message block (SMB) server, and also, a simple mail transfer protocol (SMTP) server for email transmission. However, it would be understood by one of ordinary skill in the art that the server according to the current exemplary embodiment of the present general inventive concept is not limited to the listed servers.

Alternatively, an example where the parsed Application Type field is contents will be described below.

The setting updating unit 6102 updates a setting field regarding a connection setting with respect to wireless communication in, for example, a scan-to-NFC application, a mobile printing application or a mobile scan application in order to transmit or receive contents if the user device 20 and the image forming apparatus 60 are not connected via other wireless communication methods such as Wi-Fi Direct or Bluetooth. This corresponds to a case in which contents are not transmitted or received via the NFC module 620. Here, the setting updating unit 6102 may update a connection setting of wireless communication (e.g., a media access control (MAC) address, an Internet protocol (IP) address, or the like) with respect to the user device 20 via Wi-Fi Direct or Bluetooth or the like.

When the update is completed, the user interface unit 640 may display an updated setting field via a user interface screen (not illustrated) of an application.

The control unit 610 performs an image job based on the updated result once updating of all setting fields of the application has been completed as described above.

The function and operation of the image forming apparatus 60 as described above will be further described in detail with reference to a user interface screen of the user interface unit 640 below.

Figure 8A:
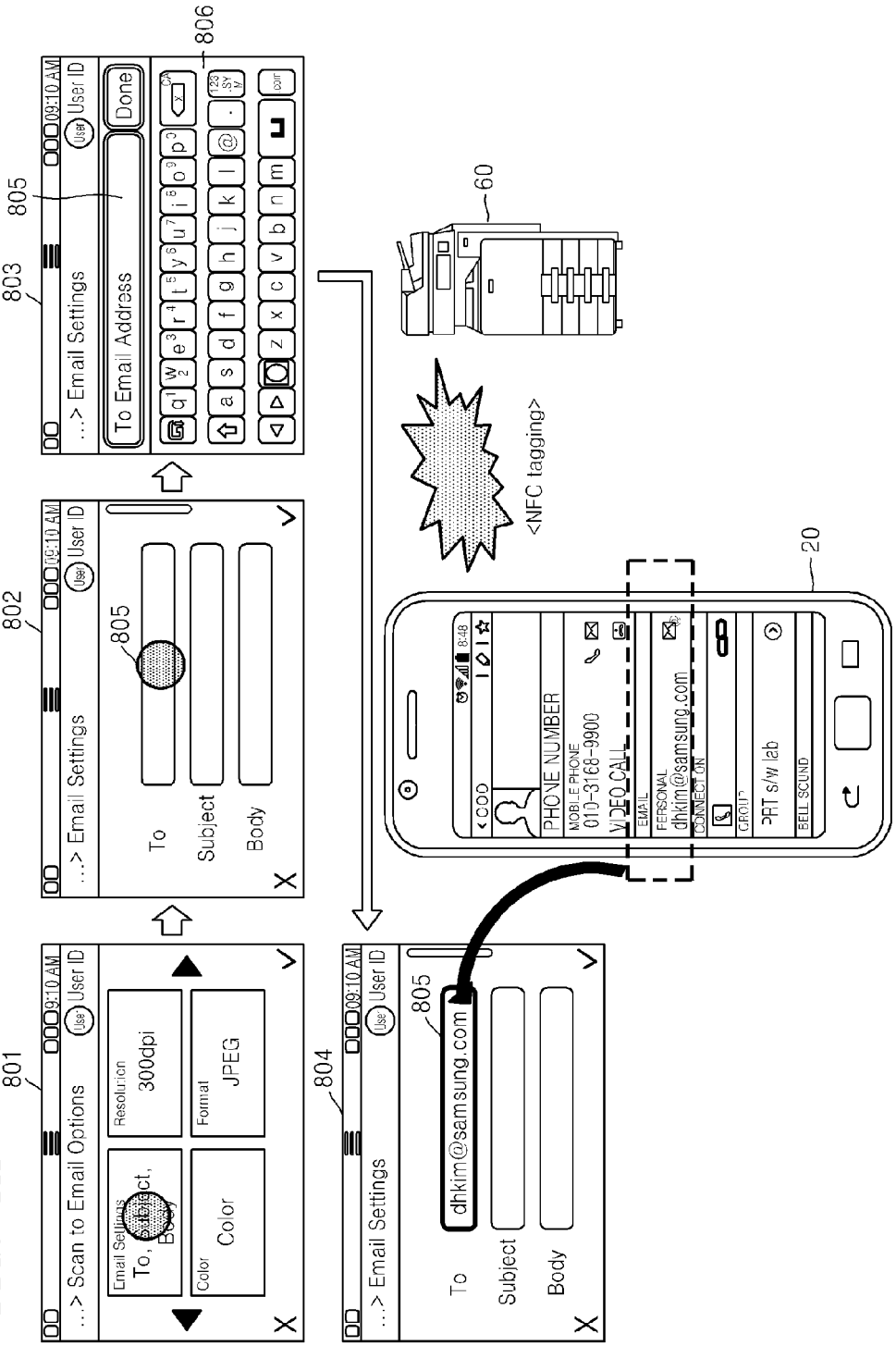
FIG. 8A illustrates an operation of setting a scan-to-email application of an image forming apparatus by using a user device having an NFC function according to an exemplary embodiment of the present general inventive concept.

FIG. 8A illustrates an operation of setting a scan-to-email application of an image forming apparatus 60 by using a user device 20 having an NFC function according to an exemplary embodiment of the present general inventive concept.

The control unit 610 executes an application to perform a scan-to-email operation. The user interface unit 640 displays a user interface screen 801 regarding a scan-to-email application. Setting fields about options in regard to a scan-to-email operation are displayed on the user interface unit 801.

When a setting field of an email setting is clicked by a user (as indicated by the gray dot in user interface screen 801), the user interface unit 640 displays a setting field 805 of a recipient email address ("To email address," indicated by the gray dot in a user interface screen 802) and setting fields of a subject and a body as illustrated on the user interface screen 802.

First, when the user has clicked the setting field 805 of the recipient email address on the user interface screen 802 in order to input a recipient email address, the user interface unit 640 displays a soft keyboard 806 together with the setting field 805 of the recipient email address as illustrated on a user interface screen 803.

Here, the image forming apparatus 60 waits for an input of a recipient email address from a user via the soft keyboard 806 of the user interface unit 640.

As described above, a user has no other option but to directly input a recipient email address via a soft keyboard 806 according to the conventional art. In particular, depending on the type of the image forming apparatus 60, if a soft keyboard 806 is not included or if a soft keyboard 806 is small, it is difficult for the user to directly input a recipient email address.

According to the current exemplary embodiment of the present general inventive concept, when the user interface screen 803 is displayed, a user tags the user device 20 to the image forming apparatus via an NFC function. Here, in the user device 20, an application related to an address book or an application installed in relation to the image forming apparatus 60 may be being executed.

The NFC module 620 receives an NDEF message including address book information stored in the user device 20. The received NDEF message may include address book information stored in the user device 20, for example, an email address of a recipient.

The message analyzing unit 6101 of the control unit 610 parses the email address of the NDEF message received from the user device 20. Then, the setting updating unit 6102 updates the parsed email address in the setting field 805 of a recipient email address of a scan-to-email application (e.g. "dhkim@samsung.com," as illustrated in FIG. 8A).

The user interface unit 640 updates the received email address received from the user device 20 in the setting field 805 of the recipient email address and displays the same as illustrated on a user interface screen 804.

Accordingly, in an exemplary embodiment of the present general inventive concept, even if contents of a setting field of an application are not directly input by a user, a setting corresponding to the setting field of the application may be performed just by NFC tagging.

Figure 8B:
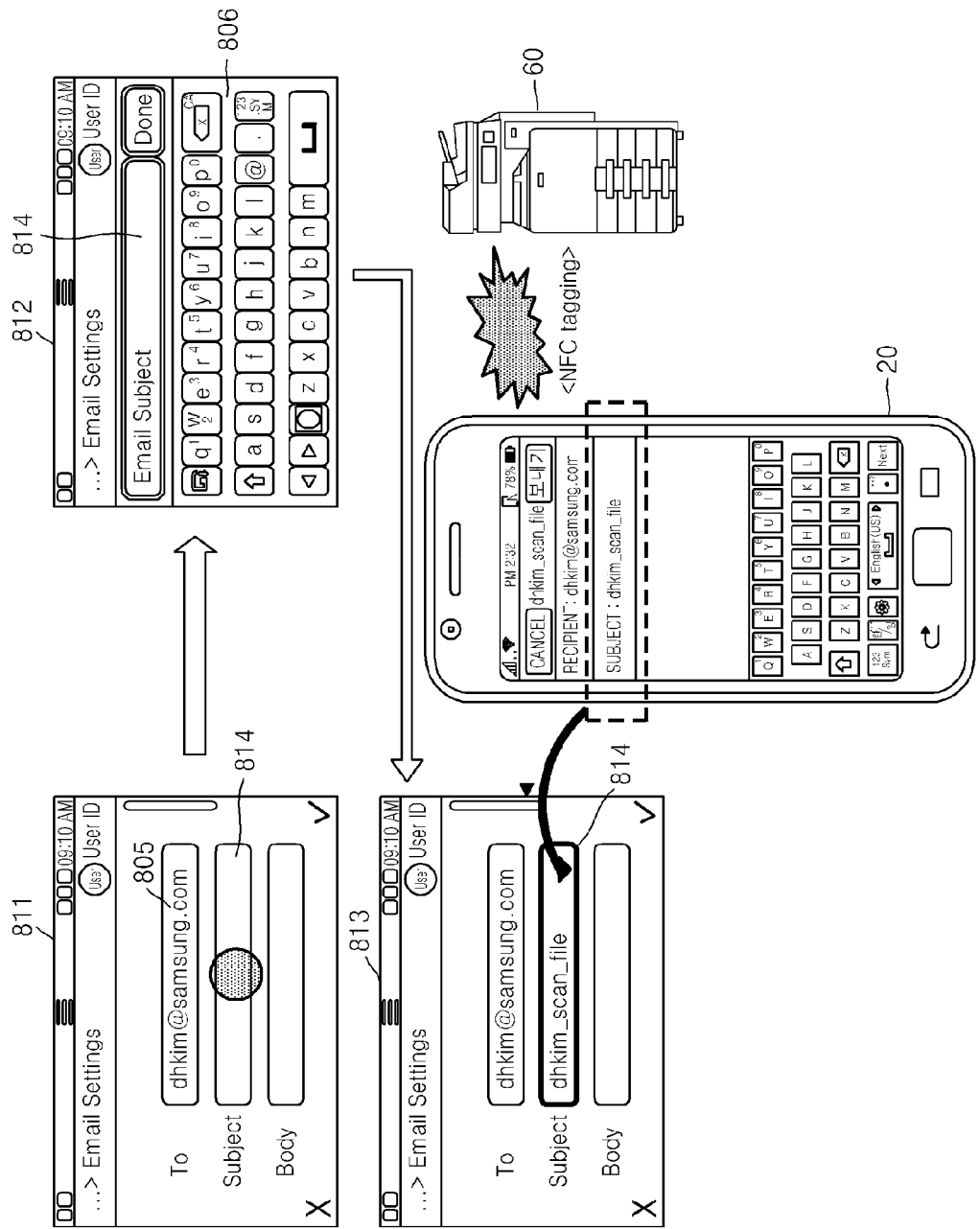
FIG. 8B illustrates an operation of setting a scan-to-email application of an image forming apparatus by using a user device having an NFC function according to an exemplary embodiment of the present general inventive concept.

FIG. 8B illustrates an operation of setting a scan-to-email application of an image forming apparatus 60 by using a user device 20 having an NFC function according to an exemplary embodiment of the present general inventive concept.

When the setting field 805 of the recipient email address is updated as described above with reference to FIG. 8A, the user interface unit 640 displays a setting field 814 of a subject, a body, and the updated recipient email address as illustrated on a user interface screen 811 in FIG. 8B.

When the user clicks the setting field 814 of the subject on the user interface screen 811 in order to input a subject (indicated by the gray dot on user interface screen 811), the user interface unit 640 displays a soft keyboard 806 together with the setting field 814 of the subject as illustrated on a user interface screen 812.

Here, the image forming apparatus 60 waits for an input of a subject from a user via the soft keyboard 806 of the user interface unit 640.

According to the current exemplary embodiment of the present general inventive concept, when the user interface screen 812 is displayed, the user tags the user device 20 to the image forming apparatus 60 via an NFC function. Here, in the user device 20, an application related to a text input or an application installed in relation to the image forming apparatus 60 may be being executed.

The NFC module 620 receives an NDEF message including text information written by the user device 20. In the received NDEF message, text information about a subject of an email written by the user device 20 (e.g., dhkim_scan_file, as illustrated in FIG. 8B) may be included.

The message analyzing unit 6101 parses text information (dhkim_scan_file) of the NDEF message received from the user device 20. Then, the setting updating unit 6102 updates the parsed text information (dhkim_scan_file) in the setting field 814 of a subject of a scan-to-email application.

The user interface unit 640 updates the text information (dhkim_scan_file) received from the user device 20 in the setting field 814 of the subject and displays the same as illustrated on a user interface screen 813.

Figure 8C:
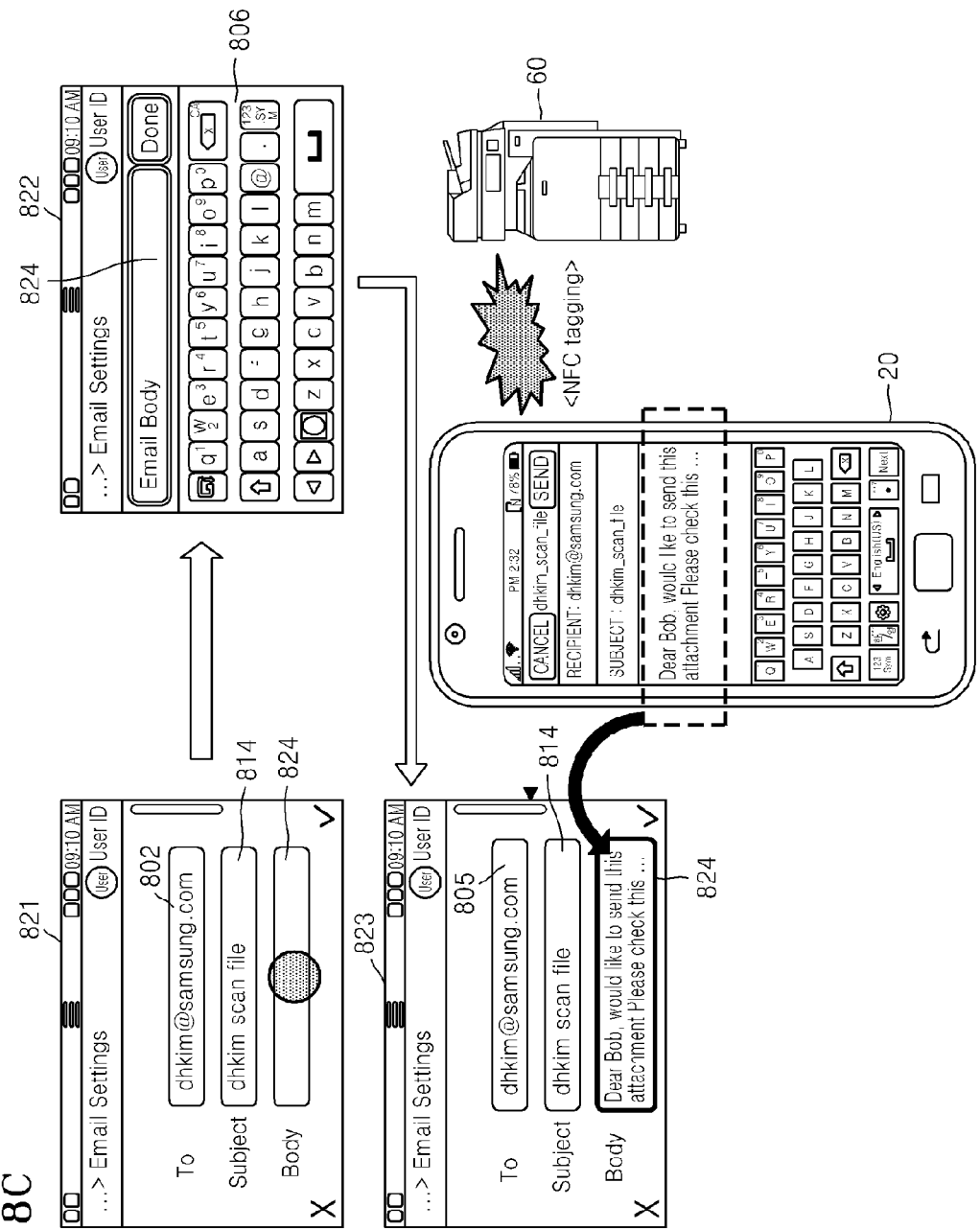
FIG. 8C illustrates an operation of setting a scan-to-email application of an image forming apparatus by using a user device having an NFC function according to an exemplary embodiment of the present general inventive concept.

FIG. 8C illustrates an operation of setting a scan-to-email application of an image forming apparatus 60 by using a user device 20 having an NFC function according to an exemplary embodiment of the present general inventive concept.

When the setting field 805 of the recipient email address and the setting field 814 of the subject are updated as described above with reference to FIGS. 8A and 8B, the user interface unit 640 displays a setting field 824 of a body and the updated recipient email address and subject as illustrated on a user interface screen 821 in FIG. 8C.

When the user clicks the setting field 824 of the body on the user interface screen 821 (indicated by the gray dot in user interface screen 821) in order to input text in a body, the user interface unit 640 displays the soft keyboard 806 together with the setting field 824 of the body as illustrated on a user interface screen 822.

Here, the image forming apparatus 60 waits for an input of an email body by a user via the soft keyboard 806 of the user interface unit 640.

When the user interface screen 822 is displayed, the user tags the user device 20 to the image forming apparatus 60 via an NFC function. Here, in the user device 20, an application related to a text input or an application installed in relation to the image forming apparatus 60 may be being executed.

The NFC module 620 receives an NDEF message including text information written by the user device 20. In the received NDEF message, text information about an email body written in the user device 20 (e.g., "Dear Bob, . . . " as illustrated in FIG. 8C) may be included.

The message analyzing unit 6101 of the control unit 610 parses text information ("Dear Bob, . . . ") of the NDEF message received from the user device 20. Then, the setting updating unit 6102 updates the parsed text information ("Dear Bob, . . . ") in the setting field 824 of the body of a scan-to-email application.

The user interface unit 640 updates the text information ("Dear Bob, . . . ") received from the user device 20 in the setting field 814 of the subject and displays the same as illustrated on a user interface screen 823.

As illustrated on the user interface screen 823, when all settings of the scan-to-email application are completed by tagging the user device 20, the control unit 610 performs the scan-to-email operation based on the updated setting fields 805, 814, and 824.

FIG. 9 illustrates an operation of setting an SMTP server of a network connection application of an image forming apparatus 60 by using a user device 20 having an NFC function according to an exemplary embodiment of the present general inventive concept.

The control unit 610 executes an application to perform a network connecting operation. The user interface unit 640 displays a user interface screen 901 regarding a network connection application.

Currently, if a network connection with respect to an SMTP server is not set in the image forming apparatus 60, the user interface unit 640 displays a message 904 indicating that an environment setting for network connection is necessary, as illustrated on a user interface screen 902.

Here, the image forming apparatus 60 waits for an input of an environment setting of an SMTP server from a user via the user interface unit 640.

When the user interface screen 902 is displayed, the user tags the user device 20 to the image forming apparatus 60 via an NFC function. Here, in the user device 20, an application related to network connection or an application installed in relation to the image forming apparatus 60 may be being executed.

The NFC module 620 receives an NDEF message including connection setting information of an SMTP server (e.g., IP:123.234.123.234, as illustrated in FIG. 9) stored in the user device 20.

The message analyzing unit 6101 of the control unit 610 parses the connection setting information (e.g., IP:123.234.123.234) of the NDEF message received from the user device 20. Then, the setting updating unit 6102 updates the parsed connection setting information (e.g., IP:123.234.123.234) in a setting field of an environment setting of a network connection application.

The user interface unit 640 updates the connection setting information (e.g., IP:123.234.123.234) received from the user device 20, in a setting field of an environment setting and displays the same as on illustrated by message 905 on a user interface screen 903.

Accordingly, even when contents of an environment setting of a network connection application are not directly input by a user, a setting corresponding to an environment setting of an SMTP server may be performed just by NFC tagging.

FIG. 10 illustrates an operation of setting a scan-to-fax application of an image forming apparatus 60 by using a user device 20 having an NFC function according to an exemplary embodiment of the present general inventive concept.

The control unit 610 executes an application to perform a scan-to-fax operation. The user interface unit 640 displays a user interface screen 1001 regarding a scan-to-fax application.

When a contact number setting is clicked by a user (indicated by the gray dot in user interface 1001), the user interface unit 640 displays a soft keyboard 806 together with a setting field 1004 of a fax number as illustrated on a user interface screen 1002.

Here, the image forming apparatus 60 waits for an input of a fax number by a user via the soft keyboard 806 of the user interface unit 640.

When the user interface screen 1002 is displayed, the user tags the user device 20 to the image forming apparatus 60 via an NFC function. Here, in the user device 20, an application related to address book information or an application installed in relation to the image forming apparatus 60 may be being executed for example.

The NFC module 620 receives an NDEF message including address book information stored in the user device 20. The received NDEF message may include the address book information stored in the user device 20, for example, a fax number of a recipient of a fax (e.g., "0123456789," as illustrated in FIG. 10).

The message analyzing unit 6101 of the control unit 610 parses the fax number ("0123456789") of the NDEF message received from the user device 20. Then, the setting updating unit 6102 updates the parsed fax number ("0123456789") in the setting field 1004 of the fax number of a scan-to-fax application.

The user interface unit 640 updates the fax number ("0123456789") received from the user device 20 in the setting field 1004 of the fax number and displays the same as illustrated on a user interface screen 1003.

Figure 11:
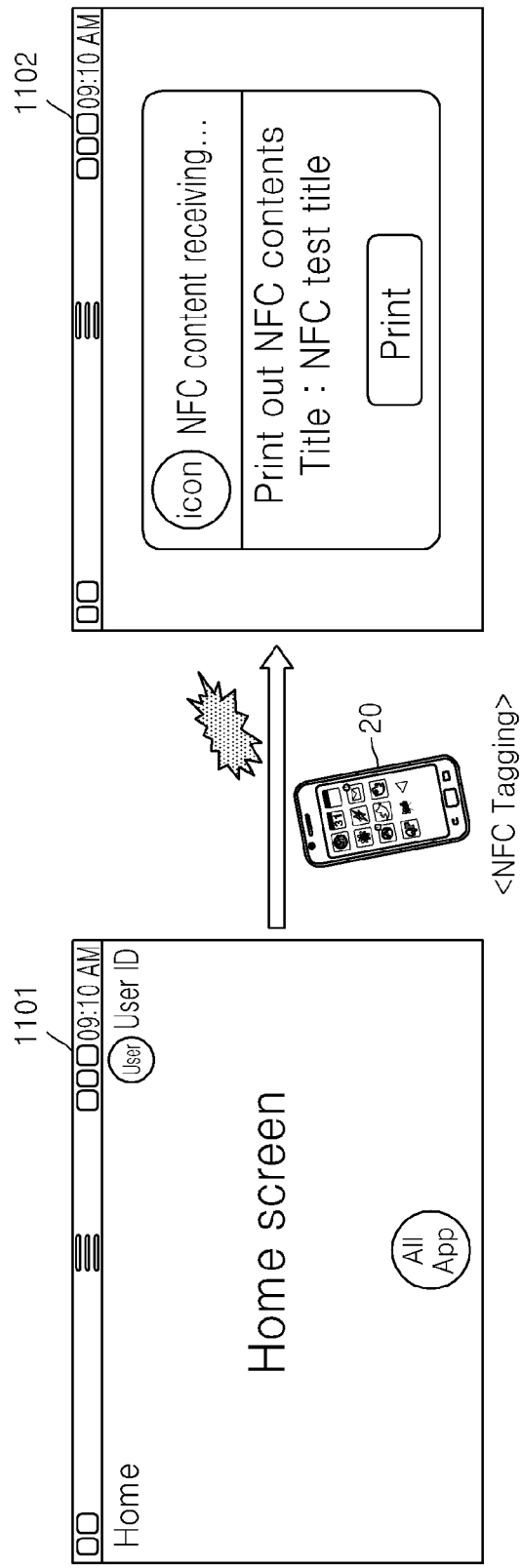
FIG. 11 illustrates an operation of performing setting of a mobile printing function of an image forming apparatus by using a user device having an NFC function according to an exemplary embodiment of the present general inventive concept.

FIG. 11 illustrates an operation of setting a mobile printing function of an image forming apparatus 60 by using a user device 20 having an NFC function according to an exemplary embodiment of the present general inventive concept. Here, a mobile printing operation refers to an operation of printing contents stored in the user device 20, performed by the image forming apparatus 60.

The control unit 610 executes an application to perform a mobile printing operation. The user interface unit 640 displays a user interface screen 1101 regarding a mobile printing application.

Here, the image forming apparatus 60 waits to receive contents from the user device 20.

When the user interface screen 1101 is displayed, the user tags the user device 20 to the image forming apparatus 60 via an NFC function. Here, in the user device 20, application related contents or an application installed in relation to the image forming apparatus 60 may be being executed.

The NFC module 620 may receive an NDEF message including contents, directly from the user device 20.

However, if the amount of data in the contents stored in the user device 20 is large, a long period of time may be required to receive the contents via the NFC module 620. If the amount of data in the contents is large, the wireless communication module 6301, which is efficient in transmission of files of large amount, may be used instead of the NFC module 620. When the wireless communication module 6301 is used, the NFC module 620 may be used simply as a unit to establish a connection between the user device 20 and the wireless communication module 6301.

Here, the wireless communication module 6301 is a module capable of performing communication via a Wi-Fi Direct or Bluetooth method. However, for convenience of description, Wi-Fi Direct will be described as an example below, but the exemplary embodiments of the present general inventive concept are not limited thereto.

When the user device 20 is tagged, the NFC module 620 transmits an NDEF message including connection setting information for Wi-Fi Direct connection with respect to the user device 20, to the user device 20.

Here, the connection setting information included in the NDEF message includes network information of the image forming apparatus 60 such as a MAC address, an IP address, or security information of the image forming apparatus 60 needed for Wi-Fi Direct connection between the user device 20 and the image forming apparatus 60.

The NDEF message transmitted to the user device 20 will be described in further detail. The NFC module 620 transmits an NDEF message in which a TNF field is set as an unknown type, an Application type is set as contents, and connection setting information of the image forming apparatus 60 is included in a Payload field, to the user device 20.

Next, the image forming apparatus 60 receives a request for Wi-Fi Direct connection from the user device 20 that has received the NDEF message. When the image forming apparatus 60 allows the request for Wi-Fi Direct connection of the user device 20, a Wi-Fi Direct connection between the image forming apparatus 60 and the user device 20 is set.

When wireless communication of a Wi-Fi Direct connection is established, the wireless communication module 6301 receives contents from the user device 20 via Wi-Fi Direct connection. The control unit 610 controls the received contents to be printed, thereby completing the mobile printing operation of the image forming apparatus 60.

Meanwhile, while the above operation is being performed, the user interface unit 640 displays a processing condition of the mobile printing operation as illustrated on a user interface screen 1102.

For convenience of description, a mobile printing operation is described above with reference to FIG. 11. However, the image forming apparatus 60 may also operate in the above manner when a scan-to-NFC operation or the like is performed.

Figure 12:
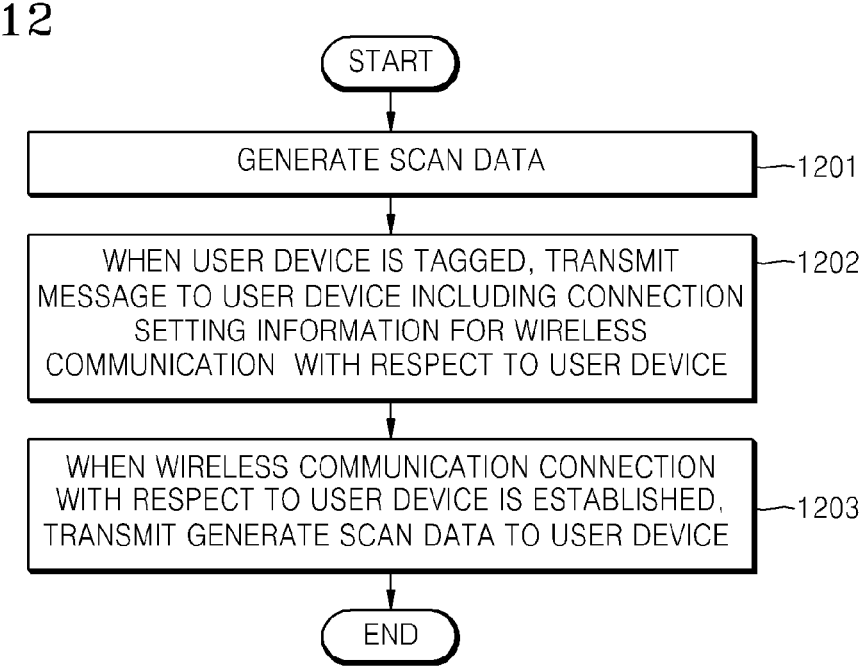
FIG. 12 is a flowchart illustrating a scan-to-NFC function performed in an image forming apparatus according to an exemplary embodiment of the present general inventive concept.

FIG. 12 is a flowchart illustrating a method of performing a scan-to-NFC function in an image forming apparatus 60 according to an exemplary embodiment of the present general inventive concept. Referring to FIG. 12, the method of performing a scan-to-NFC operation according to the current exemplary embodiment of the present general inventive concept includes operations that are performed in a time series manner in the image forming apparatus 60 illustrated in FIGS. 4 and 6A. Accordingly, descriptions omitted below but described above with reference to FIGS. 4 and 6A may also be applied to the method of performing a scan-to-NFC operation according to the current exemplary embodiment of the present general inventive concept.

In operation 1201, the scanning unit 650 generates scan data.

In operation 1202, when the user device 20 is tagged, the NFC module 620 transmits a message to the user device 20 including connection setting information for wireless communication with the user device 20.

In operation 1203, the control unit 610 controls the generated scan data to be transmitted to the user device 20 when wireless communication connection is set with respect to the user device 20. Here, wireless communication may also be performed using a wireless communication method different from that of using an NFC module.

Figure 13:
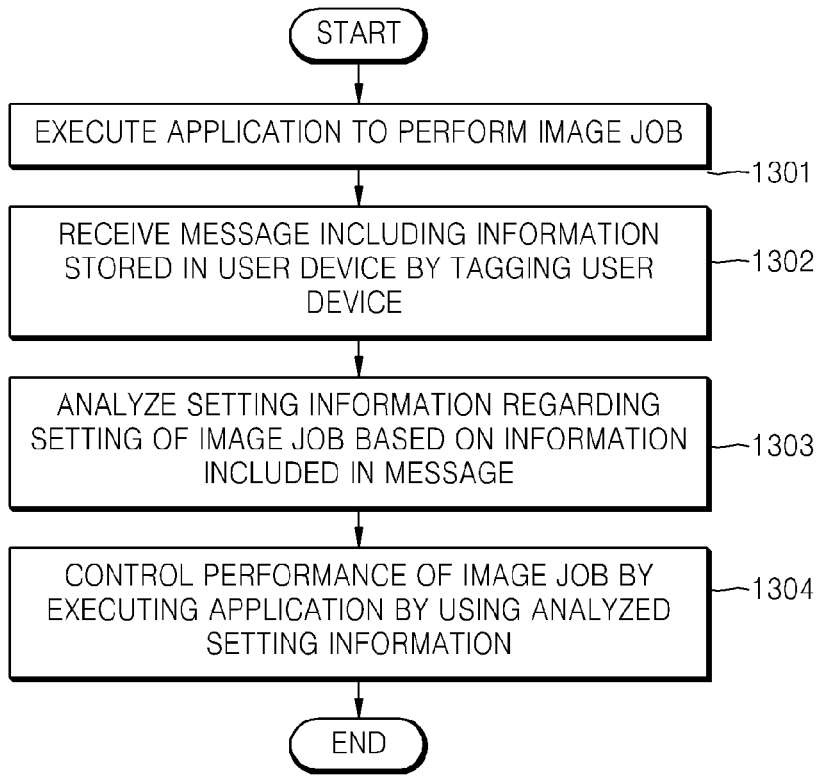
FIG. 13 is a flowchart illustrating a method of performing setting of an image job in an image forming apparatus by using a user device according to an exemplary embodiment of the present general inventive concept.

FIG. 13 is a flowchart illustrating a method of setting an image job in an image forming apparatus 60 by using a user device 20 according to an exemplary embodiment of the present general inventive concept. Referring to FIG. 13, the method of performing setting an image job according to the current exemplary embodiment of the present general inventive concept includes operations that are performed in a time series manner in the image forming apparatus 60 illustrated in FIGS. 4, 6B, and 6C. Accordingly, description omitted below but described above with reference to FIGS. 4, 6B, and 6C may also be applied to the method of performing setting of an image job according to the current exemplary embodiment of the present general inventive concept.

In operation 1301, the control unit 610 executes an application to perform an image job.

In operation 1302, the NFC module 620 receives a message including information stored in the user device 20 by tagging the user device 20.

In operation 1303, the control unit 610 analyzes setting information regarding setting of an image job based on information included in the received message.

In operation 1304, the control unit 610 controls performance of an image job by executing an application by using the analyzed setting information.

FIGS. 14A through 14D are detailed flowcharts illustrating the method of setting an image job in an image forming apparatus 60 illustrated in FIG. 12 by using a user device 20 according to an exemplary embodiment of the present general inventive concept.

In operation 1401, the control unit 610 activates the NFC module 620. Then, the NFC module 620 operates in an idle state to wait for access of an NFC device.

In operation 1402, the control unit 610 determines whether to start a scan-to-NFC operation.

In operation 1403, when a scan-to-NFC operation starts (operation 1402—Yes), the scanning unit 650 generates scan data.

In operation 1404, when generation of the scan data has been completed, the user interface unit 640 displays information indicating that tagging of the user device 20 is necessary, for example, a message such as "Tag your device."

In operation 1405, the NFC module 620 tags the user device by recognizing access of the user device 20.

In operation 1406, the NFC module 620 transmits to the user device 20 an NDEF message including connection setting information for wireless communication with respect to the user device 20.

In operation 1407, the wireless communication module 6301 receives a request for Wi-Fi Direct connection from the user device 20 that has received the NDEF message.

In operation 1408, the control unit 610 allows a request for Wi-Fi Direct connection of the user device 20. Then, connection of wireless communication via Wi-Fi Direct connection is established between the image forming apparatus 60 and the user device 20.

In operation 1409, the control unit 610 controls transmission of the generated scan data to the user device 20. Accordingly, the scan-to-NFC function of the image forming apparatus 60 is completed.

Figure 14A:
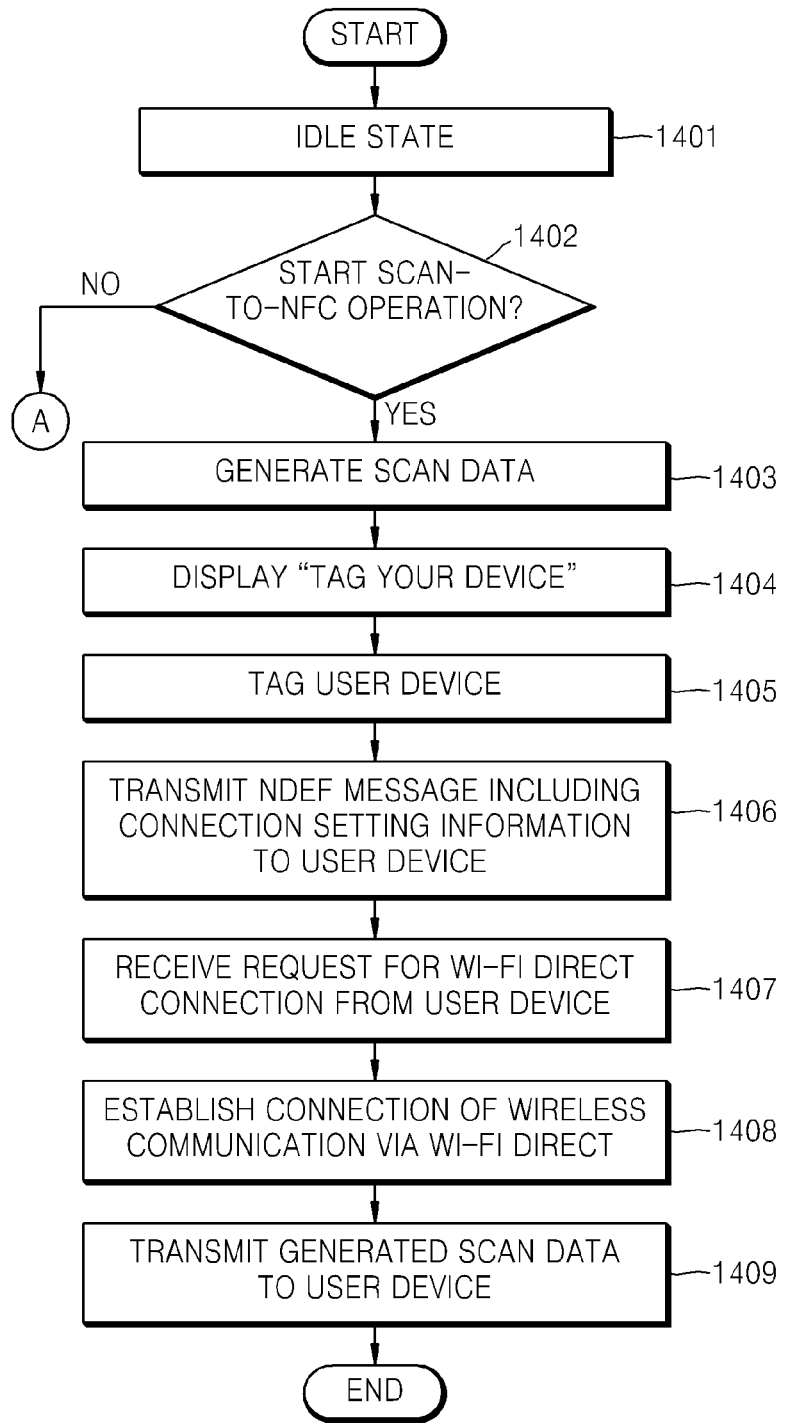
FIGS. 14A through 14D are detailed flowcharts illustrating a method of setting an image job in an image forming apparatus illustrated in FIG. 12 by using a user device according to an exemplary embodiment of the present general inventive concept.
Figure 14B:
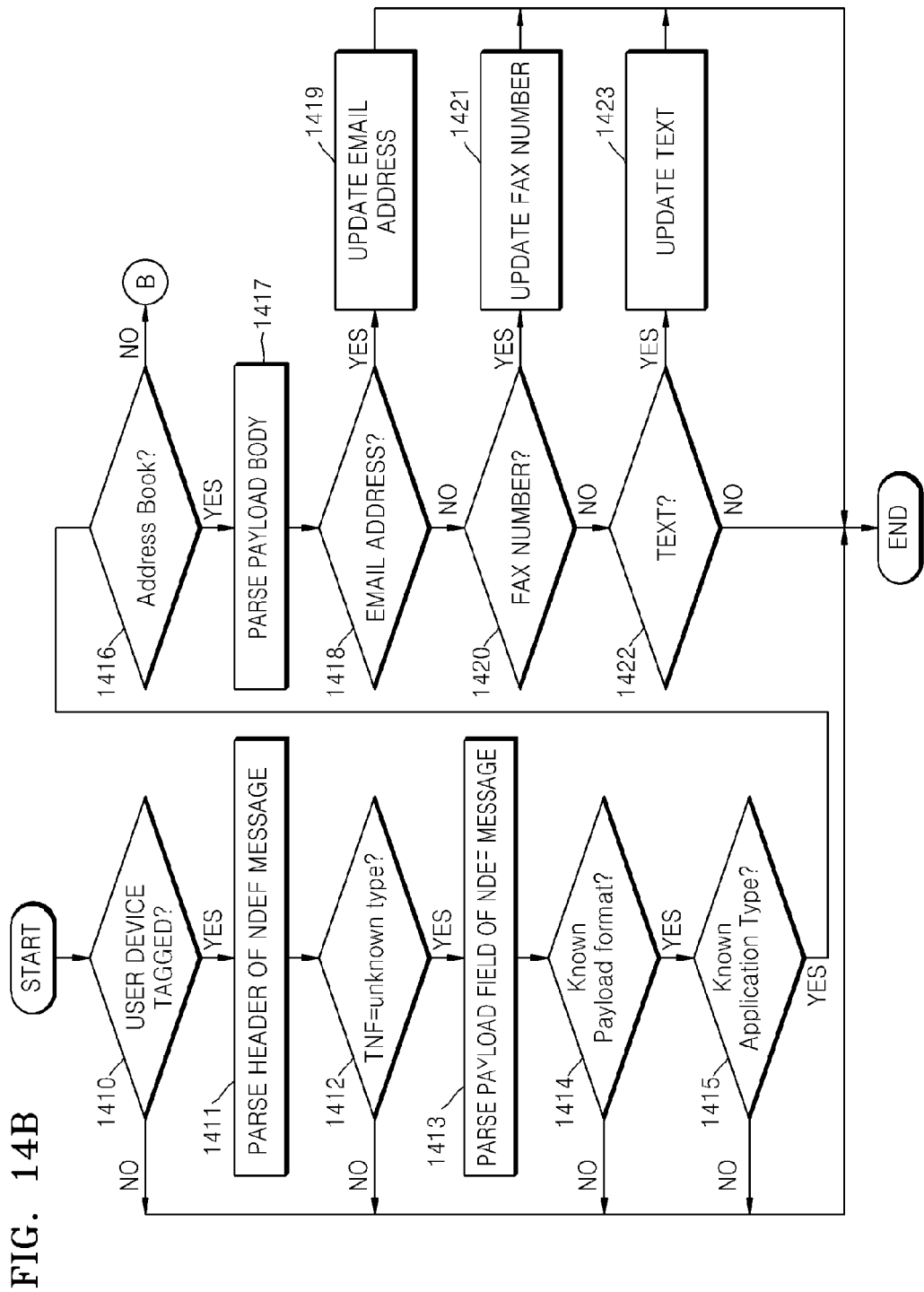

As illustrated in FIG. 14B, in operation 1410, if a corresponding operation is not a scan-to-NFC operation as a result of the determining in operation 1402 (operation 1402—No), the control unit 610 determines whether the user device 20 is tagged or not.

In operation 1411, when the user device 20 is tagged (operation 1410—Yes), the control unit 610 parses a Header of the NDEF message received from the user device 20.

In operation 1412, the control unit 610 determines whether a TNF field of the NDEF message is an Unknown Type field or not.

In operation 1413, when the TNF field is an Unknown Type field (operation 1412—Yes), the control unit 610 parses a Payload field of the NDEF message.

In operation 1414, the control unit 610 determines whether the parsed Payload field is a Known Payload Format or not.

In operation 1415, when the Payload field is a Known Payload Format (operation 1414—Yes), the control unit 610 determines whether the Application Type field is a Known Application Type field.

If the user device 20 is not tagged, the TNF field is not an Unknown Type field, the Payload field is not a Known Payload Format, or the Application Type field is not a Known Application Type field (operation 1410—No, operation 1412—No, operation 1414—No, or operation 1415—No), the process ends.

In operation 1416, when the Application Type field is a Known Application Type field (operation 1415—Yes), the control unit 610 determines whether the Known Application Type is an address book or not.

In operation 1417, when the Known Application Type is an address book (operation 1416—Yes), the control unit 610 parses a Payload Body of the NDEF message.

In operation 1418, the control unit 610 determines whether data included in the parsed Payload Body is an email address or not.

In operation 1419, when data included in the parsed Payload Body is an email address (operation 1418—Yes), the control unit 610 updates a setting field of an application with the parsed email address.

In operation 1420, if the data included in the parsed Payload Body is not an email address (operation 1418—No), the control unit 610 determines whether data included in the parsed Payload Body is a fax number or not.

In operation 1421, when the data included in the parsed Payload Body is a fax number (operation 1420—Yes), the control unit 610 updates the setting field of the application with the parsed fax number.

In operation 1422, if the data included in the parsed Payload Body is not a fax number (operation 1420—No) the control unit 610 determines whether data included in the parsed Payload Body is text or not.

In operation 1423, when the data included in the parsed Payload Body is text (operation 1422—Yes), the control unit 610 updates the setting field of the application with the parsed text.

If the data included in the parsed Payload Body is not text (operation 1422—No), the process ends. Similarly, after any of operations 1419, 1421, or 1423, the process ends.

Figure 14C:
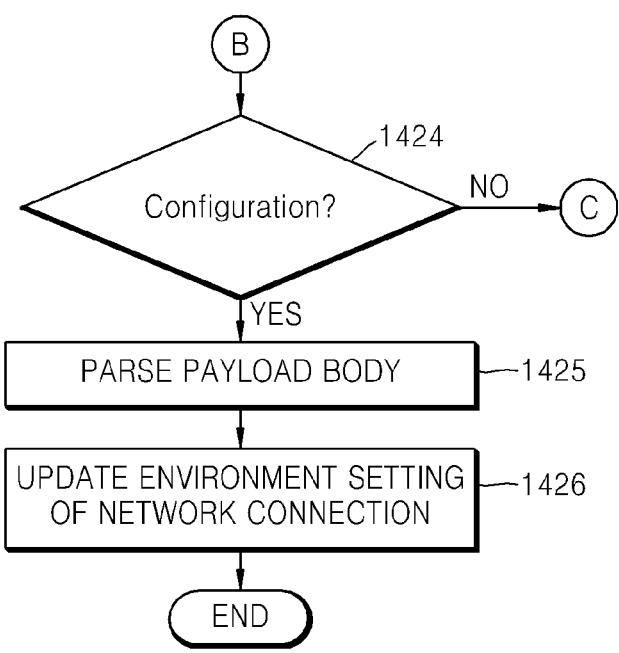

As illustrated in FIG. 14C, in operation 1424, if as a result of operation 1416 it is determined that the Known Application Type is not an address book (operation 1416—No), the control unit 610 determines whether the Known Application Type is an environment setting (Configuration) or not.

In operation 1425, if the Known Application Type is an environment setting (operation 1424—Yes), the control unit 610 parses a Payload Body.

In operation 1426, the control unit 610 updates an environment setting of the network connection of the image forming apparatus 60 according to connection setting information included in the parsed Payload Body. The process then ends.

Figure 14D:
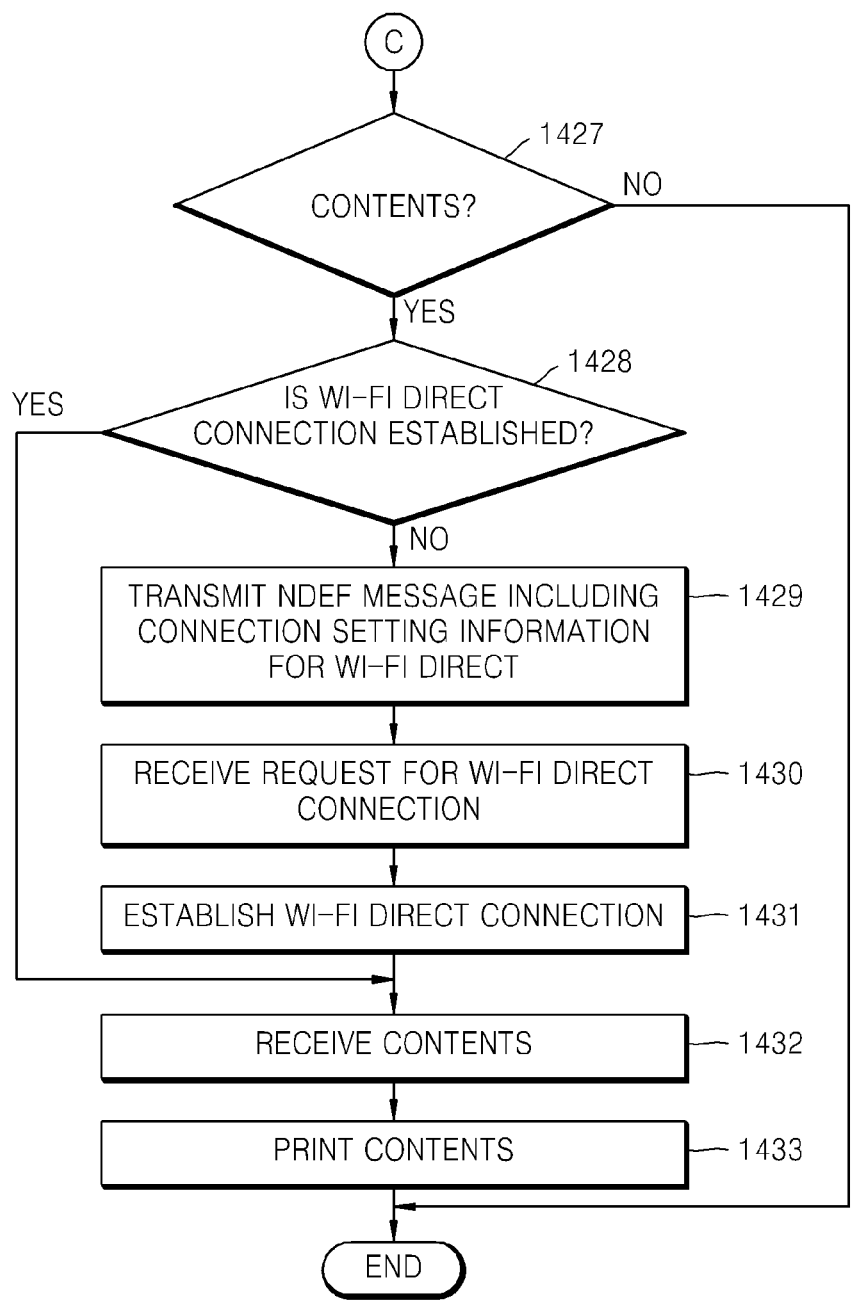

As illustrated in FIG. 14D, in operation 1427, if it is determined in operation 1424 that the Known Application Type is not an environment setting (operation 1424—No), the control unit 610 determines whether the Known Application Type is contents or not.

If it is determined in operation 1427 that the Known Application Type is not contents (operation 1427—No), the process ends.

In operation 1428, if it is determined in operation 1424 that the Known Application Type is contents (operation 1427—Yes), the control unit 610 determines whether a Wi-Fi Direct connection is established between the current user device 20 and the wireless communication module 6301.

In operation 1429, if a Wi-Fi Direct connection is currently not established (operation 1428—No), the NFC module 620 transmits an NDEF message to the user device 20 including connection setting information for Wi-Fi Direct connection with respect to the user device 20.

In operation 1430, the wireless communication module 6301 receives a request for Wi-Fi Direct connection from the user device 20.

In operation 1431, the control unit 610 allows the request for Wi-Fi Direct connection received from the user device 20. Then, a Wi-Fi Direct connection is established between the wireless communication module 6301 and the user device 20.

In operation 1432, after a Wi-Fi Direct connection is determined as established (operation 1431 or operation 1428—Yes), the wireless communication module 6301 receives contents from the user device 20 via the Wi-Fi Direct connection.

In operation 1433, the control unit 610 prints the received contents. The process then ends.

According to the exemplary embodiments of the present general inventive concept, just by NFC tagging on an NFC device, a set up of an image job may be performed based on setting information stored in the NFC device, and thus, an image forming apparatus may be conveniently used regardless of a screen configuration of a user interface screen included in the image forming apparatus, or a size of an input device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this present general inventive concept has been particularly illustrated and described with reference to exemplary embodiments thereof, it will be appreciated by those of ordinary skill in the art that changes may be made in these exemplary embodiments without departing from the principles and spirit of the present general inventive concept, the scope of which is defined in the appended claims and their equivalents. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. An image forming apparatus supporting a near field communication (NFC) function, the image forming apparatus comprising:
   a user interface unit configured to display a setting field;
   an NFC module configured to:
   tag a user device having the NFC function, and
   receive from the tagged user device a message comprising information stored in the tagged user device; and
   a control unit configured to:
   analyze setting information regarding a set up of an image job based on the information included in the received message, update the setting field using the analyzed setting information, execute an application to perform the image job according to the updated setting field, parse an NFC data exchange format (NDEF) message that is received from the tagged user device via the NFC module, and update the setting field of the application by using the analyzed setting information in correspondence with an Application Type field included in a Payload field of the parsed NDEF message.

2. The image forming apparatus of claim 1, wherein the user interface unit is further configured to display the updated setting field, wherein the updated setting field has to be input to execute the application, and wherein the user interface unit is further configured to display the analyzed setting information by updating the analyzed setting information in the displayed setting field when the user device is tagged.

3. The image forming apparatus of claim 1, wherein, when the application is executed and requires an environment setting of the image forming apparatus for network connection of the image forming apparatus, the control unit is further configured to update the environment setting of the image forming apparatus by using the analyzed setting information.

4. The image forming apparatus of claim 1, wherein the NFC module is further configured to receive the message after the application is executed by tagging the user device while being on standby for an input of a setting of the image job.

5. The image forming apparatus according of claim 1, wherein the received message comprises address book information stored in the tagged user device, wherein the control unit is further configured to update the setting field of the application, and wherein the setting fields of the application is to be input via the user interface unit by using the address book information.

6. The image forming apparatus according of claim 5, wherein the user interface unit is further configured to display the setting field for an email address when the image job is an operation of transmitting scan data to the email address, wherein the email address is included in the address book information, and wherein the control unit is further configured to control the user interface unit such that the email address that is included in the address book information is input in the displayed setting field and displayed.

7. The image forming apparatus according of claim 5, wherein the user interface unit is further configured to display the setting field for a phone number when the image job is a fax operation, wherein the phone number is included in the address book information, and wherein the control unit is further configured to control the user interface unit such that the phone number that is included in the address book information is input in the displayed setting field and displayed.

8. The image forming apparatus according of claim 1, wherein the received message comprises text information written by using the tagged user device, and wherein the control unit is further configured to update the setting field for contents of an email by using the text information when the image job is an operation of transmitting scan data to an email address.

9. The image forming apparatus according of claim 1, wherein when the image job is an operation of establishing a connection between a network interface unit of the image forming apparatus and an external network, the NFC module is further configured to receive the message including information about the connection setting to establish the connection between the tagged user device and the external network, wherein the information is stored in the tagged user device, and wherein the control unit is further configured to update the setting field for the network connection by using the information included in the received message about the connection setting.

10. The image forming apparatus according of claim 1, wherein, when the image job is an operation of printing of contents stored in the tagged user device or storing the contents in a document box of the image forming apparatus, the information included in the message received from the tagged user device includes connection setting information to establish a connection between a wireless communication module of the image forming apparatus and the tagged user device, the message being received via wireless communication, and wherein the control unit is further configured to update the setting field for the wireless communication by using the connection setting information.

11. an image forming apparatus supporting a near field communication (NFC) function, the image forming apparatus comprising:

a user interface unit configured to display a setting field;

a scanning unit configured to generate scan data;

an NFC module configured to:

receive from a tagged user device, having NFC function, a message comprising information stored in the tagged user device, and transmit to the tagged user device, the message including connection setting information for wireless communication with the tagged user device;

a control unit configured to:

analyze setting information regarding generating the scan data based on the information included in the received message, update the setting field using the analyzed setting information, execute an application to generate the scan data, control transmission of the generated scan data to the tagged user device when a connection of the wireless communication is established with the tagged user device, parse an NFC data exchange format (NDEF) message that is received from the tagged user device via the NFC module, and update the setting field of the application by using the analyzed setting information in correspondence with an Application Type field included in a Payload field of the parsed NDEF message; and a wireless communication module different from the NFC module configured to perform the wireless communication.

12. The image forming apparatus of claim 11, wherein the connection setting information included in the transmitted message comprises at least one of a media access control (MAC) address of the image forming apparatus and an Internet protocol (IP) address of the image forming apparatus.

13. The image forming apparatus according of claim 11, where the user interface unit is further configured to display the information indicating that tagging of the user device having the NFC function is necessary, after the generating of the scan data has been completed.

14. A method of performing setting of an image job by using a near field communication (NFC) device in an image forming apparatus that supports an NFC function, the method comprising:
executing an application to perform the image job;
displaying a setting field of the application via a user interface unit;
tagging a user device having the NFC function to receive a message comprising information stored in the tagged user device;
analyzing setting information related to a set up of the image job based on the information in the received message;
updating the setting field by using the analyzed setting information; and
controlling the performing of the image job by executing the application by using the updated setting field,
wherein the analyzing comprises parsing an NFC data exchange format (NDEF) message that is received from the tagged user device via an NFC Module, and
wherein the controlling comprises executing the application by updating the setting field of the application by using setting information corresponding to an Application Type field included in a Payload field of the parsed NDEF message.

15. The method of claim 14, wherein:
the setting field has to be input to execute the application; and
the analyzed setting information in the displayed setting field is updated when the user device is tagged, to display the updated analyzed setting field.

16. The method of claim 15, wherein the displayed setting field is the setting field for an email address when the image job is an operation of transmitting scan data to the email address, and is the setting field for a phone number when the image job is a fax operation,
wherein the updating of the analyzed setting information updates the analyzed setting information with address book information stored in the tagged user device.

17. The method of claim 14, wherein, when the application, which requires an environment setting of the image forming apparatus for network connection of the image forming apparatus, is executed, the controlling comprises executing the application by updating the environment setting of the image forming apparatus by using the analyzed setting information.

18. The method of claim 17, wherein the analyzed setting information is the information regarding connection setting to establish communication between the image forming apparatus and either the tagged user device or an external network.

19. A non-transitory computer readable recording medium to contain computer-readable codes as a program to execute the method of claim 14.

20. A method of performing setting of an image job by using a near field communication (NFC) device in an image forming apparatus that supports an NFC function, the method comprising:
executing an application to generate scan data;
displaying a setting field of the application via a user interface unit;
tagging a user device having the NFC function to receive a message comprising information stored in the tagged user device;
analyzing setting information related to a set up of the image job based on the information in the received message;
updating the setting field by using the analyzed setting information;
transmitting the setting field by using the analyzed setting information;
transmitting, to the tagged user device, the message including connection setting information for wireless communication with the tagged user device; and
controlling transmission of the generated scan data to the tagged user device when a connection of the wireless communication is established with the tagged user device,
wherein the wireless communication is performed by using a wireless communication module that is different from a NFC module that is performing the transmitting of the message including connection setting information,
wherein the analyzed setting information in the displayed setting field is updated when the user device is tagged, to display the updated analyzed setting field,
wherein the analyzing comprises parsing an NFC data exchange format (NDEF) message that is received from the tagged user device via an NFC module, and
wherein the executing the application comprises executing the application by updating the setting field of the application by using setting information corresponding to an Application Type field included in a Payload field of the parsed NDEF message.

21. An image forming apparatus supporting a near field communication (NFC) function, the image forming apparatus comprising:
a control unit configured to execute an application to perform an image job; and
an NFC module configured to:
tag a user device having the NFC function, and
receive, from the tagged user device, a message comprising information stored in the tagged user device,
wherein the control unit is further configured to analyze setting information regarding a set up of the image job based on the information in the received message,
wherein the image job is performed by executing the application by using the analyze setting information, and
wherein the control unit is further configured to:
parse an NFC data exchange format (NDEF) message that is received from the tagged user device via the NFC module, and
update the setting field of the application by using the analyzed setting information in correspondence with an Application Type field included in a Payload field of the parsed NDEF message.

22. A method of performing setting of an image job by using a near field communication (NFC) device in an image forming apparatus that supports an NFC function, the method comprising:
executing an application to perform the image job;
tagging a user device having the NFC function to receive a message comprising information stored in the tagged user device;
analyzing setting information related to a set up of the image job based on the information in the received message, the analyzing comprising parsing an NFC data exchange format (NDEF) message that is received from the tagged user device via an NFC Module; and controlling the performing of the image job by executing the application by using the analyzed setting information, the controlling comprising executing the application by updating a setting field of the application by using the setting information corresponding to an Application Type field included in a Payload field of the parsed NDEF message.

\* \* \* \* \*